(12) United States Patent
Gilbert et al.

(10) Patent No.: US 10,354,322 B2
(45) Date of Patent: Jul. 16, 2019

(54) TWO SIDED TRADING ORDERS

(75) Inventors: Andrew C. Gilbert, Califon, NJ (US); Andrew Stergiopoulos, New York, NY (US); Angela Stergiopoulos, legal representative, New York, NY (US); Mariann Gilbert, legal representative, Califon, NJ (US)

(73) Assignee: BGC PARTNERS, INC., New York, NY (US)

( * ) Notice: Subject to any disclaimer, the term of this patent is extended or adjusted under 35 U.S.C. 154(b) by 192 days.

(21) Appl. No.: 09/982,709

(22) Filed: Oct. 18, 2001

(65) Prior Publication Data
US 2003/0154152 A1 Aug. 14, 2003

(51) Int. Cl.
G06Q 40/00 (2012.01)
G06Q 40/04 (2012.01)

(52) U.S. Cl.
CPC .................... G06Q 40/04 (2013.01)

(58) Field of Classification Search
CPC ..................................... G06Q 40/04
USPC .................... 705/35, 37, 1, 25, 26
See application file for complete search history.

(56) References Cited

U.S. PATENT DOCUMENTS

| | | | |
|---|---|---|---|
| 3,573,747 A | 4/1971 | Adams et al. | 340/172.5 |
| 3,976,840 A | 8/1976 | Cleveland et al. | |
| 4,588,192 A * | 5/1986 | Laborde | 273/240 |
| 4,674,044 A | 6/1987 | Kalmus et al. | |
| 4,903,201 A | 2/1990 | Wagner | |
| 4,942,616 A | 7/1990 | Linstroth et al. | |
| 5,077,665 A | 12/1991 | Silverman et al. | |
| 5,101,353 A | 3/1992 | Lupien et al. | 364/408 |
| 5,136,501 A | 8/1992 | Silverman et al. | |
| 5,168,446 A | 12/1992 | Wiseman | 364/408 |
| 5,189,238 A | 2/1993 | Hayakawa | 84/609 |
| 5,243,515 A | 9/1993 | Lee | |
| 5,297,031 A * | 3/1994 | Gutterman et al. | 705/37 |
| 5,297,032 A | 3/1994 | Trojan et al. | |
| 5,375,055 A * | 12/1994 | Togher et al. | 705/37 |
| 5,394,324 A | 2/1995 | Clearwater | 364/402 |
| 5,463,547 A | 10/1995 | Markowitz et al. | |
| 5,596,347 A | 1/1997 | Robertson et al. | |
| 5,640,569 A | 6/1997 | Miller et al. | 395/729 |
| 5,682,206 A | 10/1997 | Wehmeyer | |
| 5,689,652 A | 11/1997 | Lupien et al. | |
| 5,715,402 A | 2/1998 | Popolo | |
| 5,724,357 A | 3/1998 | Derks | 370/413 |
| 5,724,524 A | 3/1998 | Hunt et al. | |

(Continued)

FOREIGN PATENT DOCUMENTS

| | | |
|---|---|---|
| CA | 2140164 | 1/1995 |
| CA | 2371673 | 11/2000 |

(Continued)

OTHER PUBLICATIONS

"Two-sided Market"—Investopedia.com.*

(Continued)

Primary Examiner — Steven S Kim
Assistant Examiner — John Winter

(57) ABSTRACT

Systems and methods for instantly quoting a two-sided market. Using these systems and methods, a trader can use various trading interfaces to initiate two-sided market orders based on a value submitted and a pre-set spread amount as configured by the trader.

18 Claims, 15 Drawing Sheets

(56) References Cited

U.S. PATENT DOCUMENTS

| | | | |
|---|---|---|---|
| 5,727,165 A | 3/1998 | Ordish et al. | |
| 5,787,402 A | 7/1998 | Potter et al. | 705/37 |
| 5,805,167 A | 9/1998 | Van Cruyningen | |
| 5,809,483 A * | 9/1998 | Broka et al. | 705/37 |
| 5,815,657 A | 9/1998 | Williams et al. | |
| 5,845,266 A | 12/1998 | Lupien et al. | |
| 5,870,724 A | 2/1999 | Lawlor et al. | |
| 5,905,975 A | 5/1999 | Ausubel | |
| 5,924,082 A | 7/1999 | Silverman et al. | 705/37 |
| 5,924,083 A | 7/1999 | Silverman et al. | |
| 5,950,177 A | 9/1999 | Lupien et al. | |
| 5,960,411 A | 9/1999 | Hartman et al. | |
| 5,963,924 A | 10/1999 | Williams et al. | |
| 5,973,619 A | 10/1999 | Paredes | |
| 6,012,046 A | 1/2000 | Lupien et al. | |
| 6,014,643 A | 1/2000 | Minton | |
| 6,016,484 A | 1/2000 | Williams et al. | |
| 6,064,981 A | 5/2000 | Barni et al. | |
| 6,098,051 A | 8/2000 | Lupien et al. | |
| 6,112,189 A | 8/2000 | Rickard et al. | |
| 6,115,698 A | 9/2000 | Tuck et al. | |
| 6,131,087 A | 10/2000 | Luke et al. | |
| 6,134,535 A | 10/2000 | Belzberg | |
| 6,161,099 A * | 12/2000 | Harrington et al. | 705/37 |
| 6,181,340 B1 | 1/2001 | Alimpich et al. | |
| 6,195,647 B1 | 2/2001 | Martyn et al. | |
| 6,233,566 B1 | 5/2001 | Levine et al. | |
| 6,236,972 B1 | 5/2001 | Shkedy | 705/37 |
| 6,247,000 B1 | 6/2001 | Hawkins et al. | |
| 6,260,024 B1 * | 7/2001 | Shkedy | 705/37 |
| 6,260,025 B1 | 7/2001 | Silverman et al. | |
| 6,272,474 B1 | 8/2001 | Garcia | |
| 6,278,982 B1 | 8/2001 | Korhammer et al. | |
| 6,343,278 B1 | 1/2002 | Jain et al. | |
| 6,408,282 B1 | 6/2002 | Buist | |
| 6,418,419 B1 * | 7/2002 | Nieboer et al. | 705/37 |
| 6,421,653 B1 | 7/2002 | May | |
| 6,473,744 B1 | 10/2002 | Tuck et al. | |
| 6,519,574 B1 | 2/2003 | Wilton et al. | |
| 6,766,304 B2 | 7/2004 | Kemp, II et al. | |
| 6,772,132 B1 | 8/2004 | Kemp, II et al. | |
| 6,809,741 B1 | 10/2004 | Bates et al. | |
| 6,836,799 B1 | 12/2004 | Philyaw et al. | |
| 6,904,602 B1 | 6/2005 | Chow et al. | |
| 6,938,011 B1 * | 8/2005 | Kemp, II | G06Q 40/00 705/35 |
| 6,993,504 B1 | 1/2006 | Freisen et al. | |
| 7,006,991 B2 | 2/2006 | Keiser et al. | |
| 7,020,632 B1 | 3/2006 | Kohls et al. | |
| 7,080,033 B2 | 7/2006 | Wilton et al. | |
| 7,085,739 B1 | 8/2006 | Winter et al. | |
| 7,089,205 B1 | 8/2006 | Abernathy | |
| 7,113,190 B2 | 9/2006 | Heaton | |
| 7,127,424 B2 | 10/2006 | Kemp, II et al. | |
| 7,155,410 B1 | 12/2006 | Woodmansey et al. | |
| 7,171,386 B1 * | 1/2007 | Raykhman | G06Q 40/04 705/37 |
| 7,184,970 B1 | 2/2007 | Squillante | |
| 7,212,999 B2 | 5/2007 | Friesen et al. | |
| 7,225,150 B2 | 5/2007 | Wilton et al. | |
| 7,243,083 B2 | 7/2007 | Burns et al. | |
| 7,379,910 B2 | 5/2008 | Abrahm et al. | |
| 7,389,268 B1 | 6/2008 | Kemp, II et al. | |
| 7,415,436 B1 | 8/2008 | Evelyn et al. | |
| 7,505,915 B2 | 3/2009 | Silverman et al. | |
| 7,505,932 B2 | 3/2009 | Kemp, II et al. | |
| 7,542,943 B2 | 6/2009 | Caplan et al. | |
| 7,577,602 B2 | 8/2009 | Singer | |
| 7,599,856 B2 | 10/2009 | Agrawal et al. | |
| 7,689,489 B2 | 3/2010 | Fergusson | |
| 7,707,086 B2 | 4/2010 | Burns et al. | |
| 7,720,742 B1 | 5/2010 | Mauro et al. | |
| 7,725,383 B2 | 5/2010 | Wilton et al. | |
| 9,996,261 B2 | 6/2018 | Kirwin et al. | |
| 2002/0029180 A1 * | 3/2002 | Kirwin | G06F 3/04895 705/37 |
| 2002/0091615 A1 | 7/2002 | Salvani | |
| 2002/0111907 A1 | 8/2002 | Ling | |
| 2002/0120546 A1 | 8/2002 | Zajac | |
| 2002/0120547 A1 | 8/2002 | Zajac | |
| 2003/0004862 A1 | 1/2003 | Lutnick et al. | |
| 2003/0018558 A1 | 1/2003 | Heffner et al. | |
| 2003/0023542 A1 | 1/2003 | Kemp, II et al. | |
| 2003/0041000 A1 | 2/2003 | Zajac et al. | |
| 2003/0061069 A1 | 3/2003 | Silverman et al. | |
| 2003/0088495 A1 | 5/2003 | Gilbert | |
| 2003/0088499 A1 | 5/2003 | Gilbert et al. | |
| 2003/0088509 A1 | 5/2003 | Wilton et al. | |
| 2003/0097325 A1 | 5/2003 | Friesen et al. | |
| 2003/0120574 A1 | 6/2003 | Wallman | |
| 2003/0120575 A1 | 6/2003 | Wallman | |
| 2006/0053074 A1 | 3/2006 | Wilton et al. | |
| 2006/0059082 A1 | 3/2006 | Silverman et al. | |
| 2007/0226126 A1 | 9/2007 | Kirwin et al. | |
| 2007/0226127 A1 | 9/2007 | Kirwin et al. | |
| 2008/0033865 A1 | 2/2008 | Wilton et al. | |
| 2008/0071664 A1 | 3/2008 | Silverman et al. | |

FOREIGN PATENT DOCUMENTS

| | | |
|---|---|---|
| CA | 2380848 | 2/2001 |
| EP | 0399850 | 11/1990 |
| EP | 0491455 | 6/1992 |
| EP | 0512702 A2 | 11/1992 |
| EP | 0665489 | 8/1995 |
| EP | 0625275 | 4/1997 |
| EP | 0 987 644 | 3/2000 |
| EP | 1100030 | 5/2001 |
| JP | 11-25158 | 1/1999 |
| WO | WO 93/15467 | 8/1993 |
| WO | WO 95/26005 | 9/1995 |
| WO | WO 98/49639 | 11/1998 |
| WO | WO 99/19821 | 4/1999 |
| WO | WO 99/26175 | 5/1999 |
| WO | WO 00/21013 | 4/2000 |
| WO | WO 00/28450 | 5/2000 |
| WO | WO 00/58862 | 10/2000 |
| WO | WO 01/16830 | 3/2001 |

OTHER PUBLICATIONS

"Market maker" and "make a market"—www.morganstanleyindividual.com/customerservice/dictionary.*

U.S. Appl. No. 09/745,651, filed Dec. 22, 2000, Kirwin, et al.

U.S. Appl. No. 11/756,875, filed Jun. 1, 2007, Kirwin, et al.

U.S. Appl. No. 11/756,964, filed Jun. 1, 2007, Kirwin, et al.

U.S. Appl. No. 09/995,698, filed Nov. 29, 2001, Gilbert.

MSDN, Microsoft Corporation, at http://msdn.microsoft.com/archive/default.asp?url=/archive/en-us/dnarvbtips/html/msdn_ msdn72.asp (printed Nov. 2, 2004).

Caprini et al., "Data Acquisition General Control User Interface," Jun. 26, 1995, at http://citeseer.ist.psu.edu/617.htrnl (printed Jul. 18, 2005).

USPTO Office Action for U.S. Appl. No. 09/745,651, dated Sep. 19, 2007 (18 pages).

USPTO Office Action for U.S. Appl. No. 09/745,651, dated Apr. 16, 2007 (18 pages).

USPTO Office Action for U.S. Appl. No. 09/745,651, dated Sep. 12, 2006 (9 pages).

USPTO Office Action for U.S. Appl. No. 09/745,651, dated Feb. 10, 2006 (10 pages).

USPTO Office Action for U.S. Appl. No. 09/745,651, dated Aug. 16, 2005 (9 pages).

USPTO Office Action for U.S. Appl. No. 09/745,651, dated Dec. 15, 2004 (9 pages).

USPTO Office Action for U.S. Appl. No. 09/745,651, dated Jan. 28, 2004 (8 pages).

USPTO Office Action for U.S. Appl. No. 11/756,875, dated Apr. 15, 2008 (15 pages).

(56) References Cited

OTHER PUBLICATIONS

USPTO Office Action for U.S. Appl. No. 11/756,875, dated Aug. 23, 2007 (12 pages).
USPTO Office Action for U.S. Appl. No. 11/756,964, dated Mar. 4, 2008 (15 pages).
USPTO Office Action for U.S. Appl. No. 11/756,964, dated Aug. 23, 2007 (12 pages).
USPTO Office Action for U.S. Appl. No. 09/995,698, dated Jan. 9, 2007 (7 pages).
USPTO Office Action for U.S. Appl. No. 09/995,698, dated Jun. 9, 2008 (8 pages).
USPTO Office Action for U.S. Appl. No. 09/745,651, dated Oct. 31, 2008 (12 pages).
USPTO Office Action for U.S. Appl. No. 11/756,875, dated Oct. 28, 2008 (11 pages).
USPTO Office Action for U.S. Appl. No. 11/756,875, dated Jan. 26, 2009 (3 pages).
USPTO Office Action for U.S. Appl. No. 11/756,964, dated Oct. 28, 2008 (13 pages).
USPTO Office Action for U.S. Appl. No. 11/756,964, dated Jan. 26, 2009 (3 pages).
USPTO Office Action for U.S. Appl. No. 09/995,698, dated Apr. 1, 2009 (9 pages).
USPTO Office Action for U.S. Appl. No. 11/756,875, dated Jun. 10, 2009 (14 pages).
USPTO Office Action for U.S. Appl. No. 11/756,964, dated May 28, 2009 (13 pages).
USPTO Notice of Allowance and Fees Due for U.S. Appl. No. 11/756,875, dated Aug. 2, 2010 (3 pages).
Trading Technologies document, "Trading System Confidential User Documentation," p. 32, allegedly 1998 (one page).
USPTO Notice of Allowance and Fees Due for U.S. Appl. No. 09/745,651, dated Aug. 4, 2010 (3 pages).
U.S. Appl. No. 12/789,006, filed May 27, 2010, Inventors: Glenn D. Kirwin, et al., entitled "Systems and Methods for Providing a Trading Interface" (48 pages).
U.S. Appl. No. 12/789,122, filed May 27, 2010, Inventors: Glenn D. Kirwin, et al., entitled "Systems and Methods for Providing a Trading Interface" (48 pages).
USPTO Examiner Interview Summary for U.S. Appl. No. 09/995,698, dated Jun. 24, 2010 (4 pages).
USPTO Petition Decision for U.S. Appl. No. 09/745,651, dated Sep. 1, 2010 (1 page).
USPTO Petition Decision for U.S. Appl. No. 11/756,875, dated Aug. 31, 2010 (1 page).
USPTO Notice of Withdrawal from Issue for U.S. Appl. No. 11/756,875, dated Sep. 1, 2010 (1 page).
Notice of Opposition filed on Jan. 15, 1998 against European Application No. EP 93904823.7 with Annex A3, document dated Jan. 16, 1998 (108 pages).
"Money Match Functional Specification," The Sequor Group, Inc. Software Services, Version 1, Aug. 1990 (87 pages).
U.S. Appl. No. 12/789,006, filed May 27, 2010, Kirwin, et al.
U.S. Appl. No. 12/789,122, filed May 27, 2010, Kirwin, et al.
USPTO Pre-Brief Appeal Conference Decision for U.S. Appl. No. 09/745,651, dated Dec. 31, 2009 (2 pages).
USPTO Examiner Interview Summary for U.S. Appl. No. 09/745,651, dated Mar. 15, 2010 (3 pages).
USPTO Examiner Interview Summary for U.S. Appl. No. 11/756,875, dated Mar. 16, 2010 (3 pages).
USPTO Examiner Interview Summary for U.S. Appl. No. 11/756,964, dated Mar. 16, 2010 (3 pages).
USPTO Office Action and Examiner Interview Summary for U.S. Appl. No. 11/756,964, dated Apr. 15, 2010 (23 pages).
Canadian Examiner's Report for Application No. 2395379, dated Apr. 29, 2010 (8 pages).
USPTO Notice of Allowance and Fees Due and Examiner Interview Summary for U.S. Appl. No. 09/745,651, dated Jun. 9, 2010 (19 pages).
USPTO Notice of Allowance and Fees Due and Examiner Interview Summary for U.S. Appl. No. 11/756,875, dated Jun. 22, 2010 (9 pages).
Hsu, Y. et al. An Approach for Designing Composite Metaphors for User Interfaces. Behavior & Information Technology. vol. 26, No. 3. May-Jun. 2007. pp. 209-220.
Jayapandian, Magesh. Automated Creation of Database Forms. Proquest Dissertations and Theses 2009. Section 0127, Part 0984. [Ph. D. dissertation]. United States—Michigan: University of Michigan. 2009. Publication No. AAT 3354270.
MacNaughton, David et al. Design and Optimization Aids for Composite Control Charts. Quality Engineering © Taylor & Francis Group, LLC. 2009.
USPTO Office Action for U.S. Appl. No. 09/745,651, dated Aug. 18, 2009 (13 pages).
Canadian Office Action for Application No. 2395379, dated Jun. 23, 2004 (5 pages).
Canadian Office Action for Application No. 2395379, dated May 27, 2005 (6 pages).
Canadian Office Action for Application No. 2395379, dated Nov. 20, 2006 (6 pages).
Canadian Office Action for Application No. 2395379, dated Oct. 15, 2007 (6 pages).
Canadian Office Action for Application No. 2395379, dated Mar. 23, 2009 (6 pages).
U.S. Appl. No. 60/171,442, filed Dec. 22, 1999 (17 pages).
U.S. Appl. No. 60/251,790, filed Dec. 7, 2000 (6 pages).
Notification of Transmittal of the International Search Report or the Declaration for International Application No. PCT/US00/34958, dated Aug. 27, 2001 (5 pages).
International Preliminary Examination Report for International Application No. PCT/US00/34958, dated Apr. 16, 2002 (4 pages).
International Search Report for International Application No. PCT/US01/47464, dated Apr. 1, 2002 (3 pages).
Written Opinion for International Application No. PCT/US01/47464, dated Jan. 20, 2003 (4 pages).
International Preliminary Examination Report for International Application No. PCT/US01/47464, dated Apr. 23, 2003 (3 pages).
International Search Report for International Application No. PCT/US02/33302, dated Jul. 21, 2003 (3 pages).
Written Opinion for International Application No. PCT/US02/33302, dated Sep. 30, 2003 (4 pages).
International Preliminary Examination Report for International Application No. PCT/US02/33302, dated Aug. 13, 2004 (3 pages).
UK Examination Report for Application No. GB 0216279.0, dated Jul. 10, 2003 (2 pages).
UK Examination Report for Application No. GB 0216279.0, dated Feb. 11, 2004 (2 pages).
UK Examination Report for Application No. GB 0216279.0, dated May 24, 2004 (1 page).
USPTO Examiner Interview Summary for U.S. Appl. No. 09/995,698, dated Sep. 11, 2009 (4 pages).
USPTO Office Action for U.S. Appl. No. 09/995,698, dated Dec. 24, 2009 (10 pages).
USPTO Examiner Interview Summary for U.S. Appl. No. 09/745,651, dated Aug. 16, 2005 (2 pages).
USPTO Examiner Interview Summary for U.S. Appl. No. 09/745,651, dated Nov. 1, 2007 (3 pages).
USPTO Examiner Interview Summary for U.S. Appl. No. 11/756,875, dated Jul. 10, 2008 (2 pages).
USPTO Examiner Interview Summary for U.S. Appl. No. 11/756,875, dated Nov. 2, 2009 (3 pages).
USPTO Examiner Interview Summary for U.S. Appl. No. 11/756,964, dated Nov. 2, 2009 (3 pages).
UK Examination Report for Application No. GB 0313935.9, dated Apr. 5, 2004 (3 pages).
Canadian Office Action for Application No. 2469510, dated Aug. 11, 2009 (4 pages).
Canadian Office Action for Application No. 2469510, dated Jul. 24, 2013 (4 pages).
Canadian Notice of Allowance for Application No. 2469510, dated Sep. 10, 2014 (2 pages).

(56) References Cited

OTHER PUBLICATIONS

Canadian Patent Appeal Board Notice for Application No. 2395379, dated Apr. 6, 2016 (6 pages).
Fan, M. (1999). The design and development of a web-based financial bundle trading market (Order No. 9959482). Available from ProQuest Central; ProQuest Dissertations & Theses Global. (304527929). Retrieved from https://search.proquest.com/docview/304527929?accountid=14753.
Gerlach, D. (Feb. 1999). Trading places: The top online brokers. PC World, 17, 177-185. Retrieved from https://search.proquest.com/docview/231366804?accountid=14753.
Canadian Office Action for Application No. 2395379, dated Jul. 14, 2014 (8 pages).
Canadian Final Office Action for Application No. 2463767, dated Apr. 5, 2018 (6 pages).

\* cited by examiner

US 10,354,322 B2

TWO SIDED TRADING ORDERS

BACKGROUND OF THE INVENTION

This invention relates to systems and methods for electronic trading of a item or instrument sold in an electronic market. More particularly, this invention provides configurable trading interfaces for electronic trading of a item or instrument sold in an electronic market.

As electronic trading becomes more popular, an increasing number of traders are in need of new systems and methods to enter trade commands in a quick, efficient, and accurate manner. In one method of electronic trading, bids and offers for a particular item are submitted independently by a trader to a trading system, those bids and offers are then displayed by the trading system to other traders, and the other traders may then respond to the bid by submitting sell (or hit) or buy (or lift or take) commands to the system. This method of electronic trading is often referred to as one-sided market trading.

Many implementations of this one-sided method of electronic trading, while generally accurate, lack in desired speed mainly because traders are forced to enter bids and offers independently for a particular item. This dual process causes much delay for traders because the traders must follow several steps prior to accomplishing a two-sided market trade. For example, many traders using typical trading systems are required to (1) click on an issue of choice, (2) click on a bid button, (3) use the keyboard to enter a price and size for the trade, (4) click on an offer button, and (5) use the keyboard to enter a price and size for the trade. This one-sided market trading approach is very time consuming.

Thus, it is an object of the present invention to provide systems and methods that enable a trader to execute two-sided market trades quickly, efficiently, and accurately.

SUMMARY OF THE INVENTION

In accordance with this and other objects of the invention, systems and methods provide configurable trading interfaces that allow a trader to instantly quote a two-sided market. A two-sided market is a market where a trader places one order, and, places a second order based on the execution of the first order. Thus, a trader may place a bid order and, upon execution of the bid order—i.e., the bid is matched by an offer order and a sale is made—the trader then immediately places an offer order on the market that corresponds to the acquired item or instrument. In accordance with this invention, the trader can use various trading interfaces to initiate two-sided market orders based on a value submitted and a pre-set spread amount as configured by the trader.

In order to initiate a two-sided market trading command using the present invention, a trader may enter the command using a command-line interface, click on a component of a bid or offer in a market cell, enter the command using a graphical interface, or may click on a piece of data in a data window. After initiating a command from a command-line interface, a market cell, or a data window, the present invention may verify the entry by presenting a graphical interface. This interface may be the same graphical interface that may be used to enter a trading command. In addition to displaying the graphical interface, a mouse pointer may be redirected to a portion of the graphical interface to speed up entry of the trading command. After initiating the command, but before completing the command, a trader may then alter the parameters of the command either to complete entry of the parameters or to correct one or more incorrect entries.

To enable customization of the graphical interface to a trader's preferences, settings controls are provided. These controls may enable the trader to set a preferred order type, cause the graphical interface to automatically close after a trade command has been entered or canceled, display a history of trade commands, set the trade item type, set how bid and offer information is displayed, set how default prices, sizes, and limits, and set position and color preferences.

As will be apparent upon reading the Detailed Description of the Preferred Embodiments, various features of the present invention may be implemented with any type of trading system for the trading of any type of item. For example, as illustrated herein, the invention may be used with a bid/offer or buy/sell trading system for trading of financial instruments, such as bonds. Likewise, as another example, the invention may be used with a matching system, wherein bids and offers are submitted by various traders and matched, for the trading of other items, such as materials and supplies for manufacturing.

BRIEF DESCRIPTION OF THE INVENTION

The above and other objects and advantages of the invention will be apparent upon consideration of the following detailed description, taken in conjunction with the accompanying drawings, in which like reference characters refer to like parts throughout, and in which.

Figure 1:
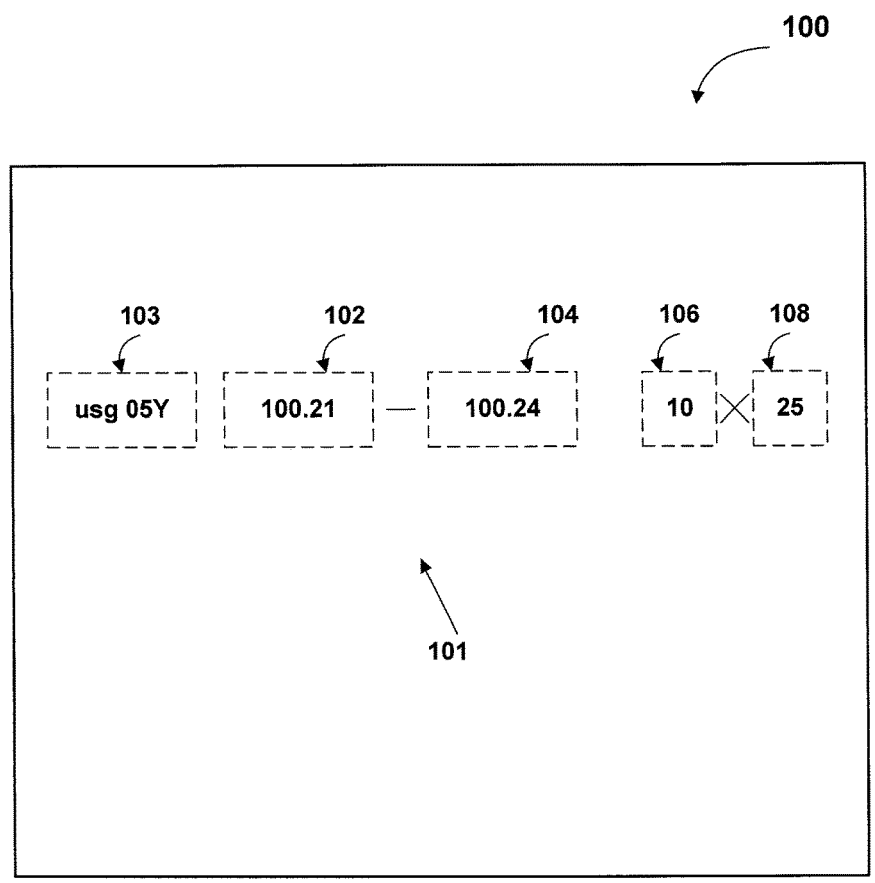
FIG. 1 is an illustration of a market cell that may be generated in accordance with certain embodiments of the present invention.
Figure 2:
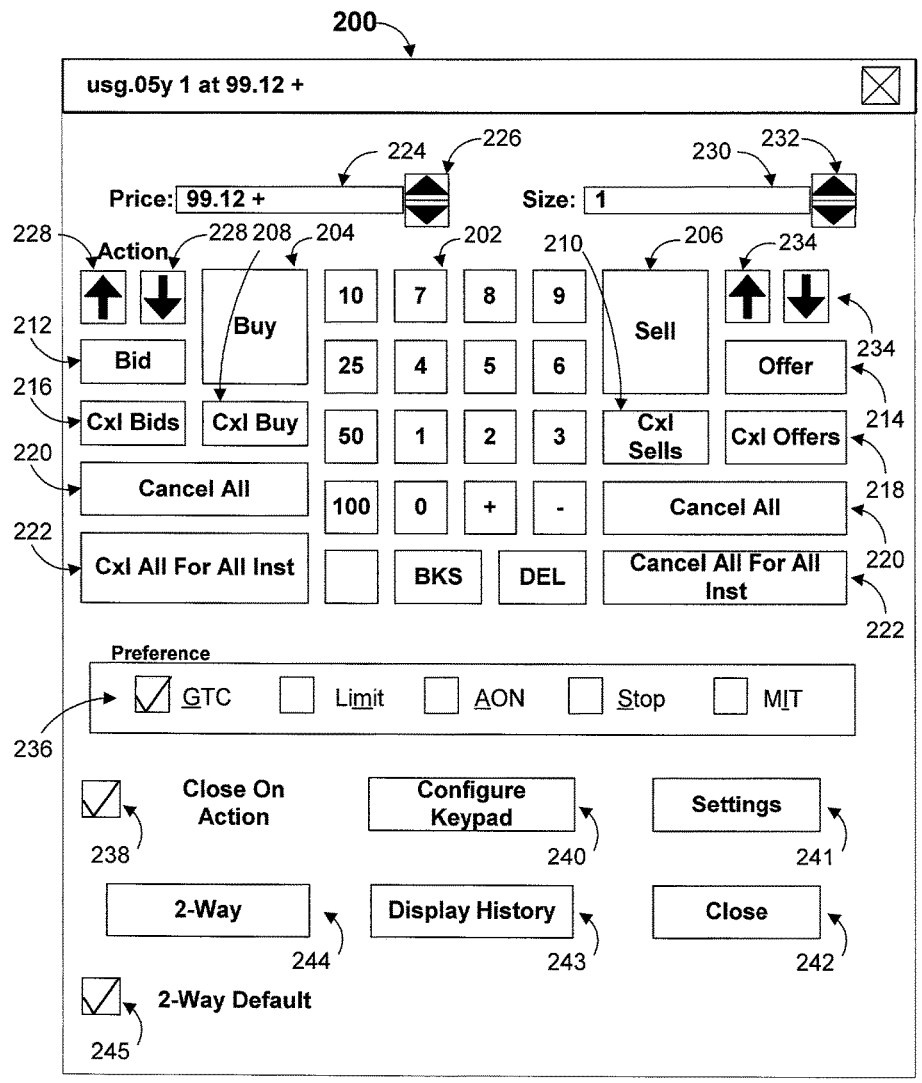
FIGS. 2 and 3 are illustrations of dialog windows that may be generated in accordance with certain embodiments of the present invention.
Figure 3:
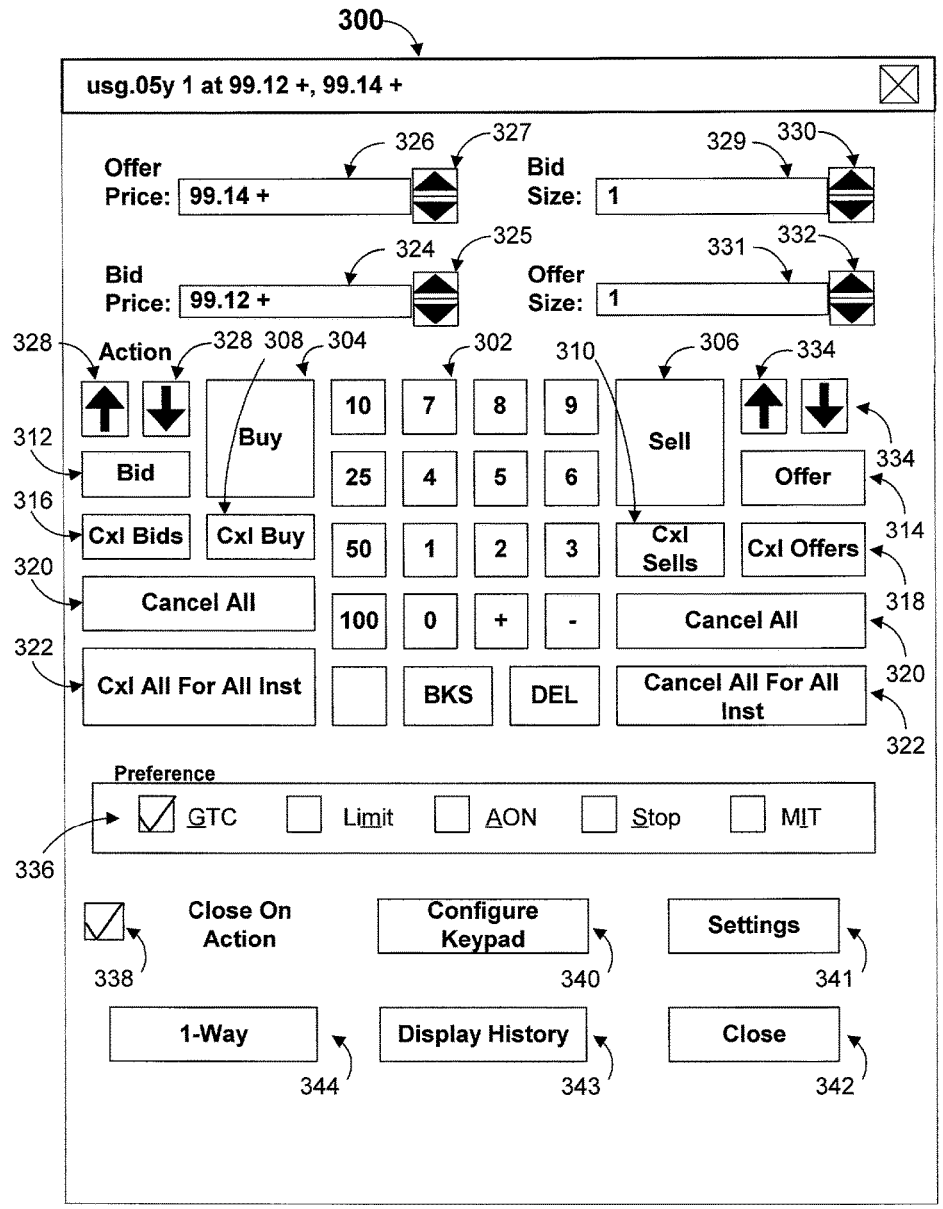
Figure 8:
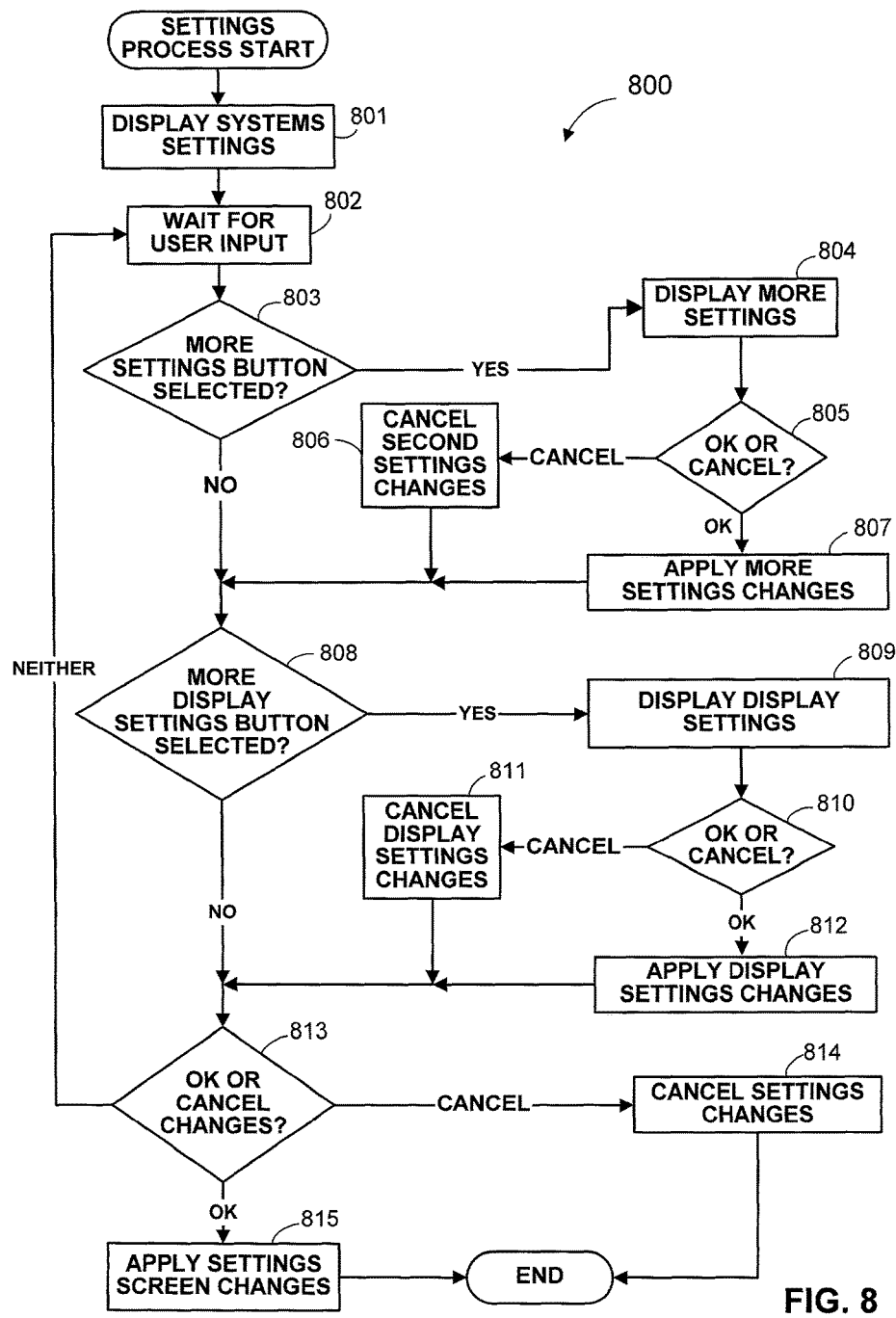
FIG. 8 is a flow diagram of a settings process that may be used to configure settings illustrated in FIGS. 1-6 in accordance with certain embodiments of the present invention.
Figure 9:
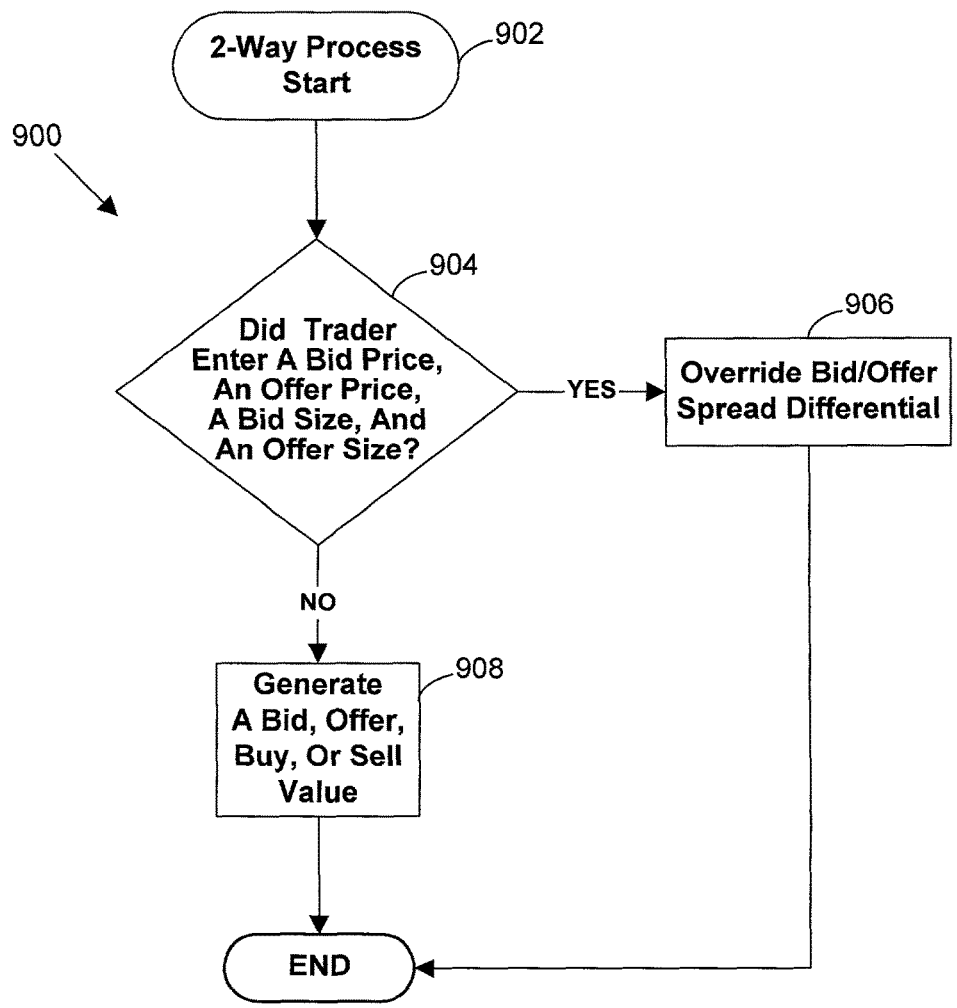
FIG. 9 is a flow diagram of a two-sided market process that may be used to generate prices for instantly quoting a two-sided market in accordance with certain embodiments of the present invention.
Figure 10:
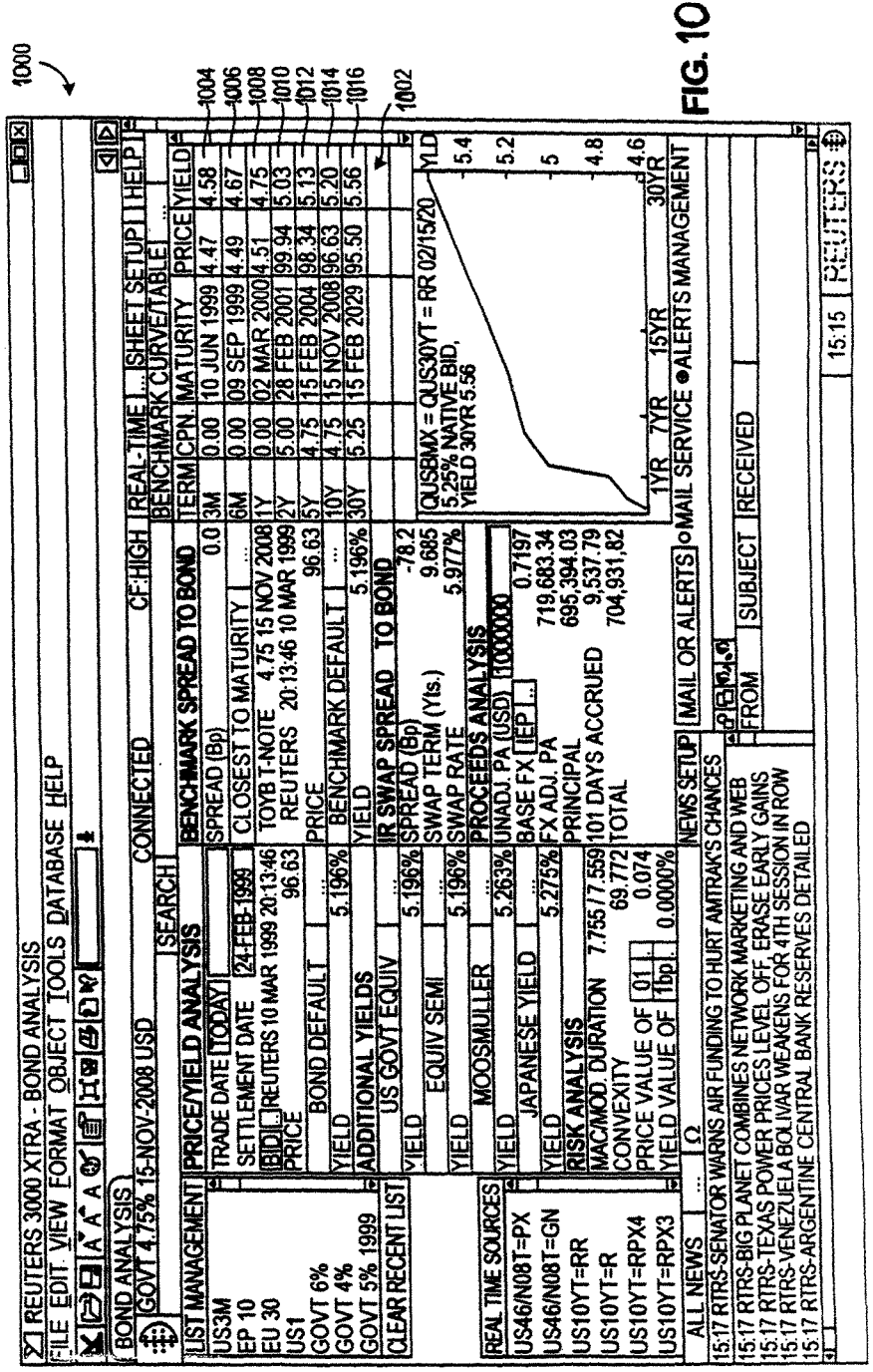
FIG. 10 is an illustration of an entry window that may be used to select items to be traded using the dialog window of FIGS. 2 and 3 in accordance with certain embodiments of the present invention.
Figure 11:
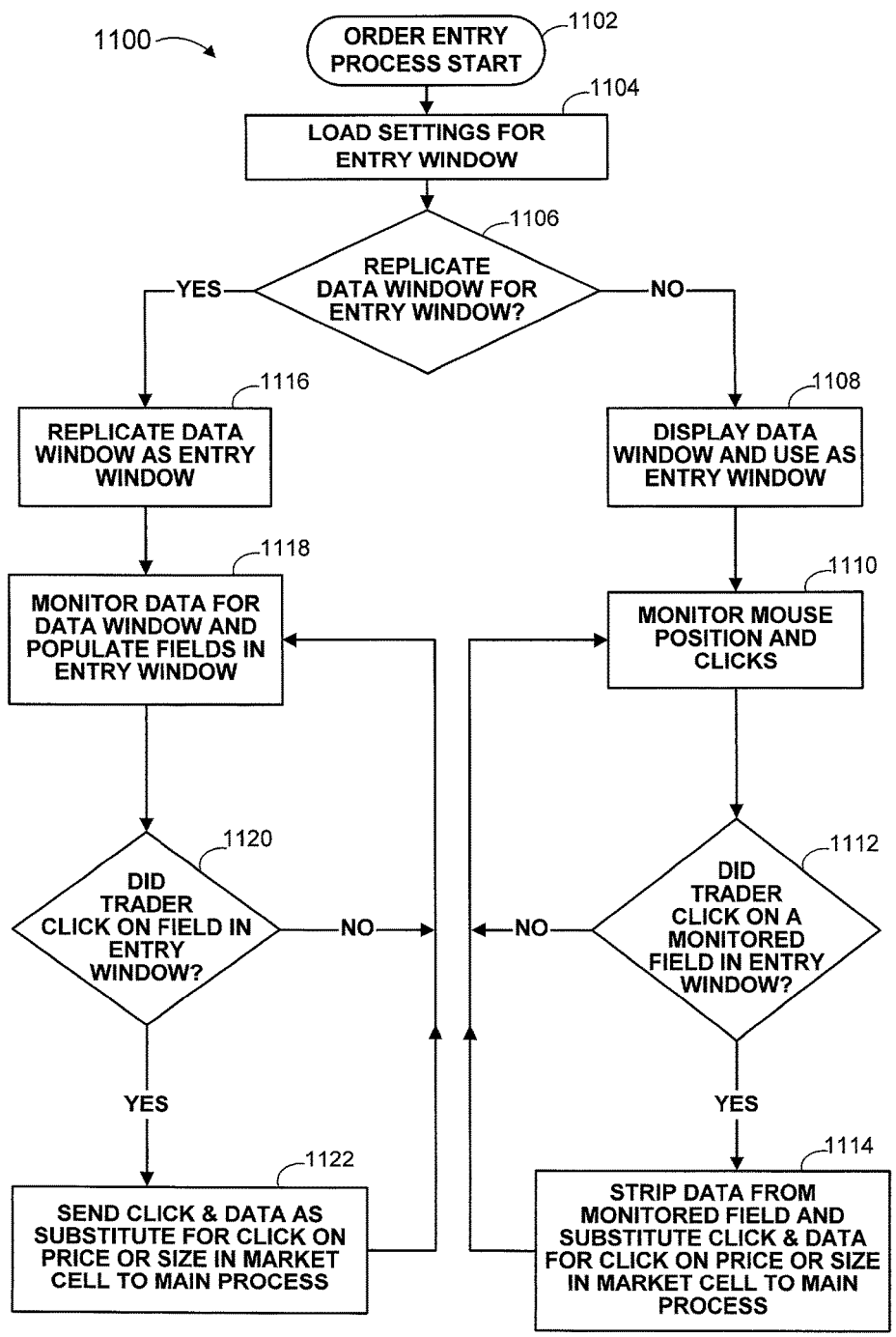
Figure 12:
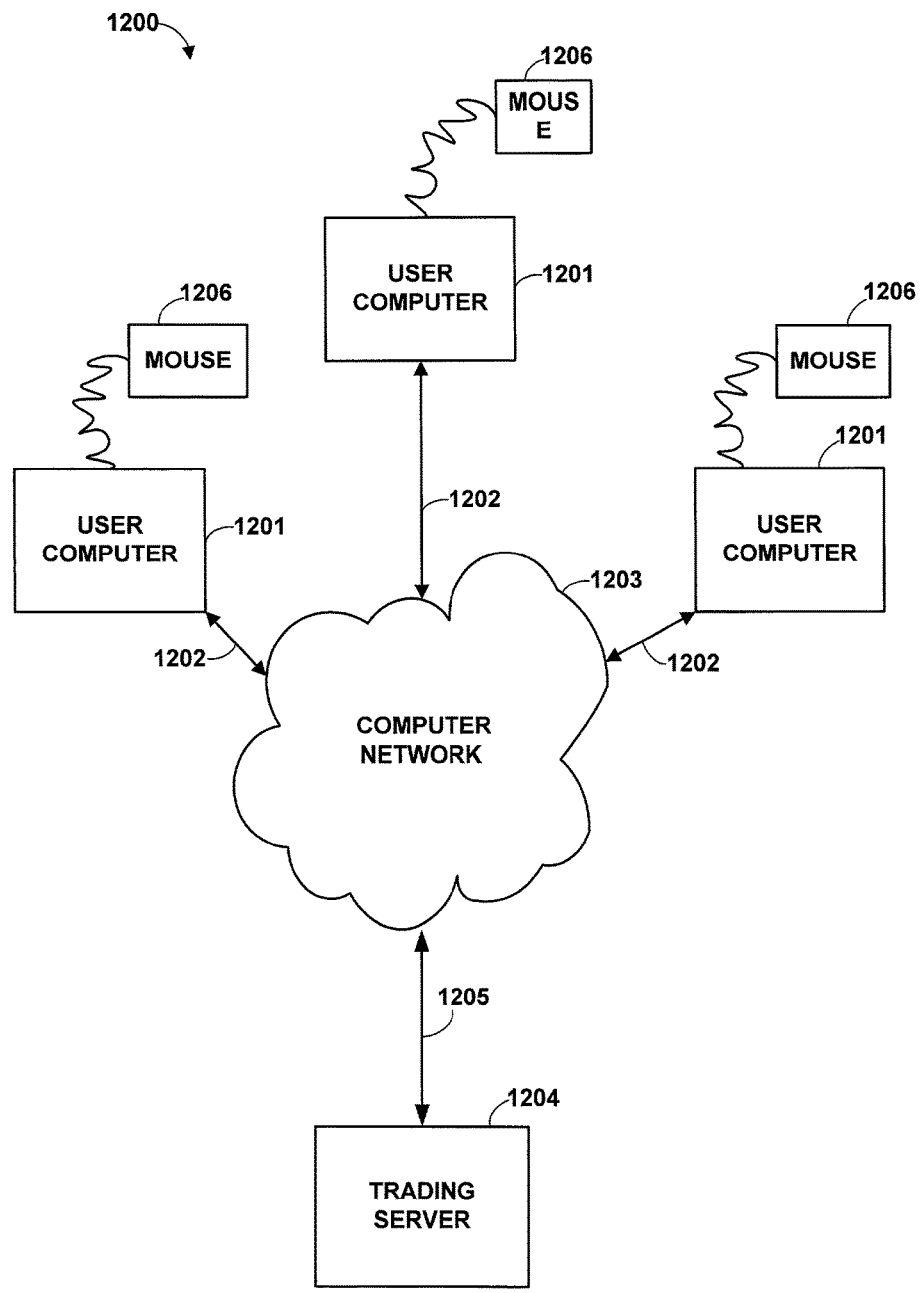

FIG. 11 is a flow diagram of an entry window process that may be used to interface the entry window of FIG. 10 with the dialog window of FIGS. 2 and 3 in accordance with certain embodiments of the present invention; and FIG. 12 is a block diagram of a system that may be used to implement the processes and functions illustrated in FIGS. 1-11 in accordance with certain embodiments of the present invention.

DETAILED DESCRIPTION OF THE PREFERRED EMBODIMENTS

The present invention relates to systems and methods for instantly quoting a two-sided market.

Currently, if a trader wishes to enter a bid and an offer order, he must do so independently. This is an arduous task, especially in a fast moving market. In accordance with the present invention, it is possible to allow a trader to enter a two-sided market order instantly. Systems and methods provide configurable trading interfaces to automate the submission of a two-sided market order.

The technique of the present invention for instantly submitting a two-sided market order uses a pre-set spread amount, configured by the trader, and an entered value to generate a bid or offer value, depending on which value is entered. For example, if a trader enters a bid price, the trader may indicate to submit a bid and offer order for a particular item, where the offer price may be automatically generated from the bid price and the pre-set spread amount. If a trader enters an offer price, the trader may indicate to submit a bid and offer order for a particular item, where the bid price may be automatically generated from the offer price and the pre-set spread amount. Accordingly, this invention prevents the need for traders to enter independent bid and offer orders for a particular item.

Turning to FIGS. 1-6, examples of screen displays that may be presented in certain embodiments of the present invention are illustrated. FIG. 1 shows a market cell 100 that may be used to display one or more bid and/or one or more offer 101 for an item to be traded. As illustrated, bid and offer 101 indicates a price 102 which a buyer is willing to pay for a selected item 103 at a given size 106 (i.e., a number of the item) and a price 104 which a seller is willing to accept for selected item 103 at a given size 108.

Each component of a market shown in market cell 100 may be marked with a color, or in any other suitable manner, to indicate features of that component. For example, as shown in FIG. 1, the entire area of fields 102, 103, 104, 106, and 108 may be colored, or only the symbols in those fields may be colored, to assign a meaning to each field. As a further example, a specific color may be assigned to field 102 to indicate that a price in the field is a bid price. Preferably, a trader is able to specify the color assigned to each component of a trade. The fields, or symbols contained therein, may be continuously colored or may be shown in a chosen color when a mouse pointer is passed over each field or used to click on each field.

In order to bid for, offer to sell, buy, and/or sell an item through market cell 100, a trader may submit a trading command indicating the action to be taken using various approaches. For example, in preferred embodiments, a trader may submit the trading command using a command-line interface, by clicking on components of bid and offer 101, and/or using a graphical interface.

When using a command-line interface, a trading command may be entered in any non-graphical interface desired. For example, a trader may submit a trading command by pressing buttons on a keyboard. Likewise, a trader could use a voice recognition system to enter commands verbally, or a trader could use some combination of voice recognition, keyboard, and pointing device.

A trader may also indicate a desire to bid, offer, buy, and/or sell an item by clicking on different portions of a bid and offer 101 for that item in market cell 100. For example, if the trader clicks on bid price 102, the trader may indicate to submit a bid for the item. If the trader clicks on offer price 104, the trader may indicate to submit an offer for the item. If the trader clicks on bid size 106, the trader may submit a command to sell the item. And, if the trader clicks on offer size 108, the trader may submit a command to buy the item.

Preferred embodiments of the present invention may allow a trader to instantly quote a two-sided market based on a pre-set spread amount as configured by the trader. For example, if the trader enters or clicks on bid price 102, the trader may indicate to submit a bid and offer order for the item, where the offer price 104 may be automatically generated from the bid price 102 and a pre-set spread amount as configured by the trader. If the trader enters or clicks on offer price 104, the trader may indicate to submit a bid and offer order for the item, where the bid price 102 may be automatically generated from the offer price 104 and a pre-set spread amount as configured by the trader.

Further, preferred embodiments of the present invention may allow a trader to use different levels of mouse button entries to initiate a trading command. That is, for flexibility, this invention may allow a trader to determine how many clicks on components of bid or offer 101 using a button of a mouse are required before the trader either bids for, offers to sell, buys, and/or sells an item corresponding to the market cell. For example, for maximum speed and slightly more risk, the trader may choose that a market be acted upon after a single click on a component of bid or offer 101. Likewise, a trader may choose to use a double click on a market before it is acted upon.

FIG. 2 illustrates one embodiment of a graphical interface for submitting one-sided trading commands. As shown, the graphical interface comprises a dialog window 200 with various buttons and entry fields 202-245. Using these buttons and entry fields, a trader may submit a bid command, an offer command, a buy command, or a sell command for an item corresponding to a market cell 100. Preferably, each traded item uses a unique dialog window 200. Dialog window 200 may be opened automatically and/or manually before, during, and/or after a trade, and may allow a trader to submit a trade command at any time. The dialog window may be repositioned on a trader's display and/or fixed in place. The trader, preferably, will keep the window associated with a particular item below the market cell 100 for the same tradable item. The number of dialog windows 200 that can be kept open at any one time is preferably unlimited.

As shown in FIG. 2, dialog window 200 may comprise a variety of on-screen buttons and entry fields. Generally, a button, as displayed in box 200, may be "pushed" by placing a pointing device's pointer over the button and pressing a switch on the pointing device, as is commonly known in the art. At the center of window 200, a numeric keypad 202 may be displayed. The numeric keypad 202 may provide buttons for numbers zero through nine, and may contain buttons for numbers ten, twenty-five, fifty, and one hundred or any other suitable or desirable values. The numeric keypad 202 may also contain a plus button ("+"), a minus button ("−"), a decimal point button ("."), a backspace button ("BKS"), and a delete button ("DEL").

In addition to displaying a numeric keypad as described above, dialog window 200 may also provide a user with a buy button 204, a sell button 206, a cancel buys button 208, a cancel sells button 210, a bid button 212, an offer button 214, a cancel bids button 216, a cancel offers button 218, cancel all button 220, cancel all for all instruments button 222, a price entry field 224, price up and down buttons 226, bid price up and down buttons 228, offer price up and down buttons 234, a size entry field 230, and size up and down buttons 232. Dialog window 200 may contain a preference field 236 that allows a user to specify preferred types of orders, a close-on-action box 238 that causes dialog window 200 to be automatically closed after specified actions are performed, a configure keypad button 240 that allows a user to arrange the keypad for dialog window 200, a close button 242 that closes the dialog window 200 on demand, a settings button 241, and a display history button 243 that causes a history list of order entries to be displayed when pressed. Finally, dialog window 200 may contain a 2-Way button 244 and a 2-Way box 245. 2-way button 244 causes a two-sided market trading dialog box, as illustrated in FIG. 3, to display and may allow the trader to enter two-sided trades. By selecting box 245, the trader may enable two-sided trading as the default mode of trading. If two-sided trading is set as the default mode, all orders will be initiated as two-sided market orders.

Preference field 236 may be used to indicate the user's preferred trade type and may allow the user to select any type of trade that a particular exchange or trading system supports. Although FIG. 2 provides specific examples of trade types (e.g., good-till-canceled (GTC), limit, all-or-none (AON), stop, and market-if-touched (MIT)), the invention may be implemented with any type of trade.

Configure keypad button 240 may allow a trader to arrange buttons appearing in dialog window 200 to be anywhere a trader prefers by first pressing the configure keypad button 240, by then dragging the buttons to new positions, and finally by clicking on button 240 again. Also, the configuration or reconfiguration of buttons can change the function of those buttons depending on the type of trading desired or what type of item is being traded.

Although any of the approaches described herein to submitting a trading command may be used independently of the others, two or more approaches may also be used substantially simultaneously. For example, when using a command-line interface, an entry verification feature of the present invention may display a graphical interface to confirm a trader's intentions after a command-line trade command has been entered. Similarly, as another example, after clicking on a component of a bid and offer 101 in a market cell 100, an entry verification feature of the present invention may display a graphical interface to a trader to allow the trader to alter and/or confirm the command being submitted.

To speed entry of a trading command when using various approaches to submit a trading command substantially simultaneously, the present invention preferably includes a pointer warping feature that redirects the focus of the pointing device pointer to another location of the trader's display. In accordance with this feature, for example, when a trader clicks on a bid price 102 ($100.21 as depicted in FIG. 1) in a market cell 100, a dialog window 200 may pop-up (if not already open), and a pointer that is being used by the trader may be immediately redirected to a bid button 212 to save the trader the time of repositioning the pointer to that location. Once in the new location, the trader may then use the pointer to confirm and/or modify the trade command and then submit the trade command using bid button 212. Although this feature of the present invention is described in connection with a pointing device pointer, this feature may be implemented using any suitable graphical interface pointer, cursor, or similar object.

Assume instead that, in the previous example, the trader wants to increase bid price 102 to $100.22. When the appropriate trade submission approaches are used substantially simultaneously, the trader may click anywhere on the displayed bid and offer 101, and thereby cause dialog window 200 to appear. At this point, the trader may press bid button 212 once and thereby cause bid price 102 ($100.21 as illustrated in FIG. 1) to appear in price entry field 224. To increase bid price 102 from $100.21 to $100.22, the trader may then press price up button 226, or press bid price up button 228. When dealing with an offer, the trader may press price up button 226 or press offer price up button 234. Because time is typically of the essence, the trader will preferably use bid price up button 228 or offer price up button 234 because it is closer to bid button 212. Finally, to submit the bid, the trader may click on bid button 212 again to submit the bid. Alternatively, if the trader didn't want to alter the price, the trader could have double clicked immediately on bid button 212.

After any trade command is entered by pressing bid button 212, offer button 214, buy button 204, or sell button 206, the mouse pointer may then be maintained in its position above the just-pushed button in case the trader wants to repeat entry of the same trade command shortly thereafter.

As indicated above, a trader may never need to type a full price in field 102. Instead, a trader may configure the dialog window to automatically post in price entry field 224 either the current bid or offer price or a pre-programmed-increment-better bid or offer price of a bid or offer that the trader clicks on. Alternatively, a trader may point to each individual number or quantity (i.e., 0-9, 10, 25, 50, or 100) in keypad 202 and, in effect, input the desired price (or size) using a mouse.

In order to enter a size for a bid, offer, buy, or sell command, a trader may either choose to use a pre-programmed default size or adjust the size of a trade in size entry field 230. When the trader is either bidding or offering, size entry field 230 preferably will initially always show a pre-set size amount as configured by the trader. To increase or decrease the size, the trader may either push the size up or size down buttons 232, or delete the size and enter a new size using the keypad 202.

Preferably, by default, size entry field 230 is filled with a selected bid or offer size and highlighted when dialog window 200 is opened in response to a trader clicking on the selected bid or offer size. By highlighting the size entry field 230, a trader may change the size by simply pushing any of the buttons on keypad 202 without first highlighting and/or deleting numbers in that field. Once a desired size is entered, a trader may then push sell button 206 or buy button 204 and submit an order to sell or buy the size appearing in size entry field 230.

Another way for a trader to bid is to choose an item and a size and then press bid button 212 without designating a price. By entering a bid in this manner, the trader simply joins the best bid that appears on the trader's screen for that item. Although this approach to entering a bid is extremely easy and fast, a trader is risking that in the moment just prior to pressing bid button 212, the bid price appearing on the screen may change and thus force a trader to use the new price. Should this occur, a trader may press the cancel bids button 216 and re-enter a desired bid using the method described above.

As mentioned above, an entry verification feature of the present invention may be used substantially simultaneously with a command-line interface or a click on bid or offer interface to cause a graphical interface to be presented after a trader submits a command-line trade command or clicks on a component of a bid or offer. For example, if using a command-line interface, a trader submits a command to bid at a certain price for a certain size, a dialog window 200 may automatically appear (if not already shown), price and size fields 224 and 230 may be populated with the certain price and the certain size, and the pointer may be warped to just above bid button 212. The trader can then press bid button 212 to confirm the command or alter the price and/or size as described above.

Although the illustrations above are discussed in connection with bidding for and buying of an item, it should be obvious to those of ordinary skill in the art that the same features of the present invention are available in the offering for and selling of an item. Offer and sell buttons may be used instead of bid and buy buttons to offer and sell, respectively, an item.

FIG. 3 illustrates another embodiment of a graphical interface for submitting trading commands. As shown, the graphical interface comprises many of the same features as illustrated in FIG. 2. FIG. 3, as opposed to FIG. 2 however, may be used for two-sided market trading, and the additional features in FIG. 3 are added to facilitate two-sided market trading. As shown, the graphical interface comprises a dialog window 300 with various buttons and entry fields 302-344. Using these buttons and entry fields, a trader may simultaneously initiate a bid command and an offer command for an item corresponding to a market cell 100. Preferably, each traded item uses a unique dialog window 300. Dialog window 300 may be opened automatically and/or manually before, during, and/or after a trade, and may allow a trader to submit a trade command at any time. The dialog window may be repositioned on a trader's display and/or fixed in place. The trader, preferably, will keep the window associated with a particular item below the market cell 100 for the same tradable item. The number of dialog windows 300 that can be kept open at any one time is preferably unlimited.

As shown in FIG. 3, dialog window 300 may comprise a variety of on-screen buttons and entry fields. Generally, a button, as displayed in box 300, may be "pushed" by placing a pointing device's pointer over the button and pressing a switch on the pointing device, as is commonly known in the art. At the center of window 300, a numeric keypad 302 may be displayed. The numeric keypad 302 may provide buttons for numbers zero through nine, and may contain buttons for numbers ten, twenty-five, fifty, and one hundred or any other suitable or desirable values. The numeric keypad 302 may also contain a plus button ("+"), a minus button ("−"), a decimal point button ("."), a backspace button ("BKS"), and a delete button ("DEL").

In addition to displaying a numeric keypad as described above, dialog window 300 may also provide a user with a buy button 304, a sell button 306, a cancel buys button 308, a cancel sells button 310, a bid button 312, an offer button 314, a cancel bids button 316, a cancel offers button 318, cancel all button 320, and cancel all for all instruments button 322. To facilitate two-sided trading, dialog window 300 preferably provides a user with a bid price entry field 324, bid price up and down buttons 325, an offer price entry field 326, offer price up and down buttons 327, a bid size entry field 329, bid size up and down buttons 330, an offer size entry field 331, and offer size up and down buttons 332. In accordance with these fields and buttons, for example, when a trader enters a bid price 102 or an offer price 104, the trader may instantly quote a two-sided market. For example, if a trader enters a bid price, the trader may indicate to submit a bid and offer order for a particular item, where the offer price may be automatically generated from the bid price and the pre-set spread amount. If a trader enters an offer price, the trader may indicate to submit a bid and offer order for a particular item, where the bid price may be automatically generated from the offer price and the pre-set spread amount.

Dialog window 300 may contain a preference field 336 that allows a user to specify preferred types of orders, a close-on-action box 338 that causes dialog window 300 to be automatically closed after specified actions are performed, a configure keypad button 340 that allows a user to arrange the keypad for dialog window 300, a close button 342 that closes the dialog window 300 on demand, a settings button 341, and a display history button 343 that causes a history list of order entries to be display when pressed. Finally, dialog window 300 may contain a 1-Way button 344. 1-way button 344 causes a one-sided trading dialog box, as illustrated in FIG. 2, to display and may allow the trader to enter one-sided trades.

Preference field 336 may be used to indicate the user's preferred trade type and may allow the user to select any type of trade that a particular exchange or trading system supports. Although FIG. 3 provides specific examples of trade types (e.g., good-till-canceled (GTC), limit, all-or-none (AON), stop, and market-if-touched (MIT)), the invention may be implemented with any type of trade.

Configure keypad button 340 may allow a trader to arrange buttons appearing in dialog window 300 to be anywhere a trader prefers by first pressing the configure keypad button 340, by then dragging the buttons to new positions, and finally by clicking on button 340 again. Also, the configuration or reconfiguration of buttons can change the function of those buttons depending on the type of trading desired or what type of item is being traded.

Although any of the approaches described herein to submitting a trading command may be used independently of the others, two or more approaches may also be used substantially simultaneously. For example, when using a command-line interface, an entry verification feature of the present invention may display a graphical interface to confirm a trader's intentions after a command-line trade command has been entered. Similarly, as another example, after clicking on a component of a bid and offer 101 in a market cell 100, an entry verification feature of the present invention may display a graphical interface to a trader to allow the trader to alter and/or confirm the command being submitted.

To speed entry of a trading command when using various approaches to submit a trading command substantially simultaneously, the present invention preferably includes a pointer warping feature that redirects the focus of the pointing device pointer to another location of the trader's display. In accordance with this feature, for example, when a trader clicks on a bid price 102 ($100.21 as depicted in FIG. 1) in a market cell 100, a dialog window 300 may pop-up (if not already open), and a pointer that is being used by the trader may be immediately redirected to a bid button 312 to save the trader the time of repositioning the pointer to that location. Once in the new location, the trader may then use the pointer to confirm and/or modify the trade command and then submit the trade command using bid button 312. Although this feature of the present invention is described in connection with a pointing device pointer, this feature may be implemented using any suitable graphical interface pointer, cursor, or similar object.

Assume instead that, in the previous example, the trader wants to increase bid price 102 to $100.22. When the appropriate trade submission approaches are used substantially simultaneously, the trader may click anywhere on the displayed bid and offer 101, and thereby cause dialog window 300 to appear. At this point, the trader may press bid button 312 once and thereby cause bid price 102 ($100.21 as illustrated in FIG. 1) to appear in bid price entry field 324. To increase bid price 102 from $100.21 to $100.22, the trader may then press bid price up button 325, or press bid price up button 328. When dealing with an offer, the trader may press offer price up button 327 or press offer price up button 334. Because time is typically of the essence, the trader will preferably use bid price up button 328 or offer price up button 334 because it is closer to bid button 312. Finally, to submit the bid, the trader may click on bid button 312 again to submit the bid. Alternatively, if the trader didn't want to alter the price, the trader could have double clicked immediately on bid button 312.

After any trade command is entered by pressing bid button 312, offer button 314, buy button 304, or sell button 306, the mouse pointer may then be maintained in its position above the just-pushed button in case the trader wants to repeat entry of the same trade command shortly thereafter.

To speed entry of a trading command when using various approaches to submit a trading command substantially simultaneously, the present invention preferably includes a two-sided market trading feature that automatically generates a value based on a submitted value and a pre-set spread amount as configured by the trader. In accordance with this feature, for example, when a trader enters a bid price 324, an offer price 326 may be generated based on the bid price 324 submitted and pre-set spread amount as configured by the trader. These values may then be used to initiate a bid and offer order for a particular item. Accordingly, this feature prevents the need for traders to enter independent bid and offer orders for a particular item. As indicated, a trader may never need to type an offer price in field 326. Instead, a trader may configure the dialog window to automatically post in offer price entry field 326 a price generated from a bid price 324 and a pre-set spread amount as configured by the trader. Likewise, when a trader enters an offer price 326, a bid price 324 may be generated based on the offer price 326 submitted and a pre-set spread amount as configured by the trader. Although this feature of the present invention is described in connection with generating price values, this feature may be implemented to generate any other suitable values.

The two-sided market trading feature may be used substantially simultaneously with a command-line interface or a click on bid or offer interface to cause a value to be generated. For example, if using a command-line interface, a trader submits a command to bid at a certain bid price for a certain bid size and a certain offer size, an offer price may automatically be generated and a bid and offer order subsequently initiated.

As indicated above, a trader may never need to type a full price in field 102. Instead, a trader may configure the dialog window to automatically post in bid price entry field 324 the current bid or in offer price entry field 326 the current offer price or a pre-programmed-increment-better bid or offer price of a bid or offer that the trader clicks on. Alternatively, a trader may point to each individual number or quantity (i.e., 0-9, 10, 25, 50, or 100) in keypad 302 and, in effect, input the desired price (or size) using a mouse.

In order to enter a size for a bid, offer, buy, or sell command, a trader may either choose to use a pre-programmed default size or adjust the size of a trade in size entry fields 329 or 331. When the trader is either bidding and/or offering, bid size entry field 329 and offer size entry field 331 preferably will initially always show a pre-set size amount as configured by the trader. To increase or decrease the size, the trader may either push the size up or size down buttons 330 or 332, or delete the size and enter a new size using the keypad 302.

Preferably, by default, size entry field 329 or 331 is filled with a selected bid or offer size and highlighted when dialog window 300 is opened in response to a trader clicking on the selected bid or offer size. By highlighting the size entry field 329 or 331, a trader may change the size by simply pushing any of the buttons on keypad 302 without first highlighting and/or deleting numbers in that field. Once desired sizes are entered, a trader may then push bid button 312 or offer button 334 and submit an order to bid and offer the sizes appearing in size entry fields 329 and 331.

Another way for a trader to bid and offer is to choose an item and a size and then press bid button 312 without designating a price. By entering a bid and an offer in this manner, the trader simply joins the best bid that appears on the trader's screen for that item and the offer will be generated from that bid and a pre-set spread amount as configured by the trader. Although this approach to entering a bid and an offer is extremely easy and fast, a trader is risking that in the moment just prior to pressing bid button 312, the bid price appearing on the screen may change and thus force a trader to use the new price. Should this occur, a trader may press the cancel bids button 316 and re-enter a desired bid using the method described above.

As mentioned above, an entry verification feature of the present invention may be used substantially simultaneously with a command-line interface or a click on bid or offer interface to cause a graphical interface to be presented after a trader submits a command-line trade command or a clicks on a component of a bid or offer. For example, if using a command-line interface, a trader submits a command to bid at a certain price for certain bid and offer sizes, a dialog window 300 may automatically appear (if not already shown), price and size fields 324, 326, 329, and 331 may be populated with the certain price and the certain size, and the pointer may be warped to just above bid button 312. The trader can then press bid button 312 to confirm the command or alter the price and/or size as described above.

Although the illustrations above are discussed in connection with bidding for and buying of an item, it should be obvious to those of ordinary skill in the art that the same features of the present invention are available in the offering for and selling of an item. Offer and sell buttons may be used instead of bid and buy buttons to offer and sell, respectively, an item.

Figure 4:
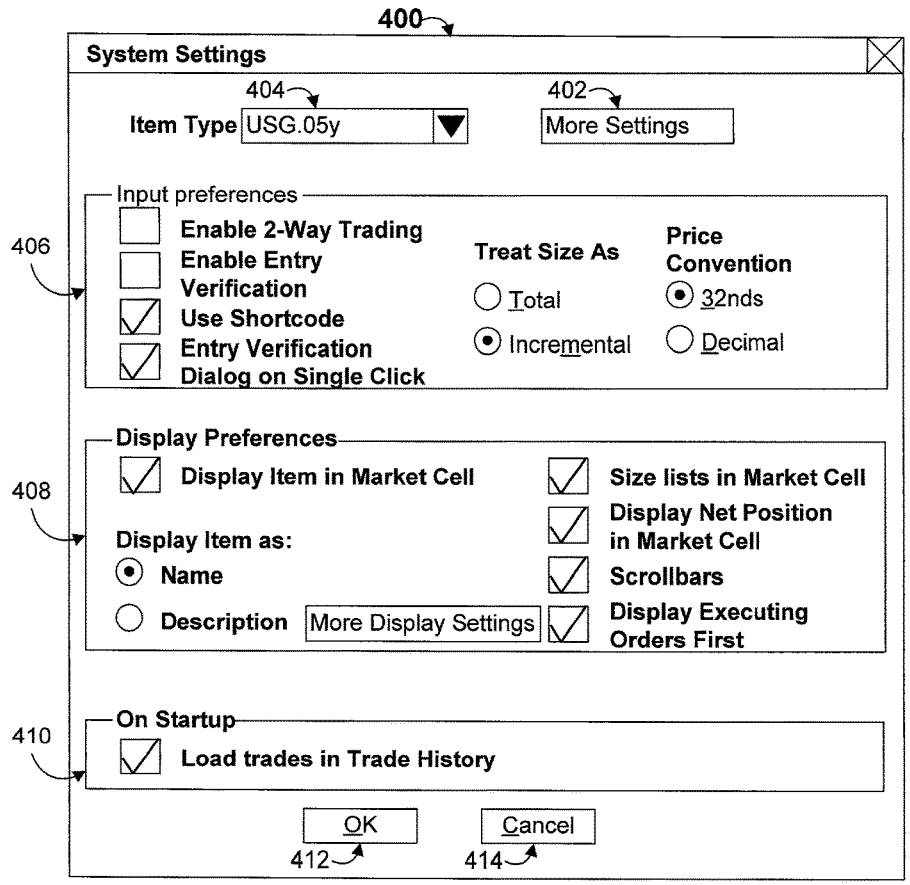
FIGS. 4 and 5 are illustrations of system settings windows that may be generated in accordance with certain embodiments of the present invention.

FIG. 4 shows a system settings screen 400 that may be presented upon a trader pressing "settings" button 241 in dialog window 200, "settings" button 341 in dialog window 300 or a corresponding function key. In order for preferred embodiments of the present invention to operate ideally for a trader, the trader may have to configure at least one setting in systems settings screen 400. Systems setting screen 400 may comprise a "more settings" button 402, an item type selection field 404, input preference settings 406, display preference settings 408, an on-startup preference setting 410, an "OK" button 412, and a "Cancel" button 414.

Within the item type selection field 404, a trader may select a preferred item type by indicating a type of item to be traded. For example, as illustrated in FIG. 4, item type selection field 404 indicates that the item to be traded is a 5 year U.S. Treasury bond. Other available item types, including financial instruments, bets or wagering instruments, or other tradable items, however, may be displayed and selected using a drop-down list associated with item type selection field 404.

Input preference settings 406 may allow a trader to enable or disable the two-sided market trading feature and the entry verification feature, use short codes to facilitate futures contracts transactions (when futures contracts are a tradable item), open dialog window 200 or 300 when a single click is entered on a bid or offer, select whether an entered size is treated as a total size or an incremental size, and select whether a price is displayed in 32nds format or decimal format.

Display preference settings 408 may enable a trader to specify how bids and offers are displayed. More particularly, preference settings 408 may allow a trader to indicate whether to display a current item in a market cell 100, whether to display the current item by name or description, whether to list sizes for various bids and offers in the market cell, whether to display the net position in the market cell, whether to display scroll bars for the market cell, whether to display executing orders for the item first in the market cell, and whether to allow the trader to configure other display preferences by pressing "more display settings" buttons. An on-startup preference setting 410 may enable a trader to indicate whether trades from a previous trading session are loaded into the trade history upon start-up of dialog window 200 or 300. Finally, an "OK" button 412 and a "Cancel" button 414 may be provided to enable a trader to indicate whether to accept recently inputted changes or cancel the changes, respectively.

Figure 5:
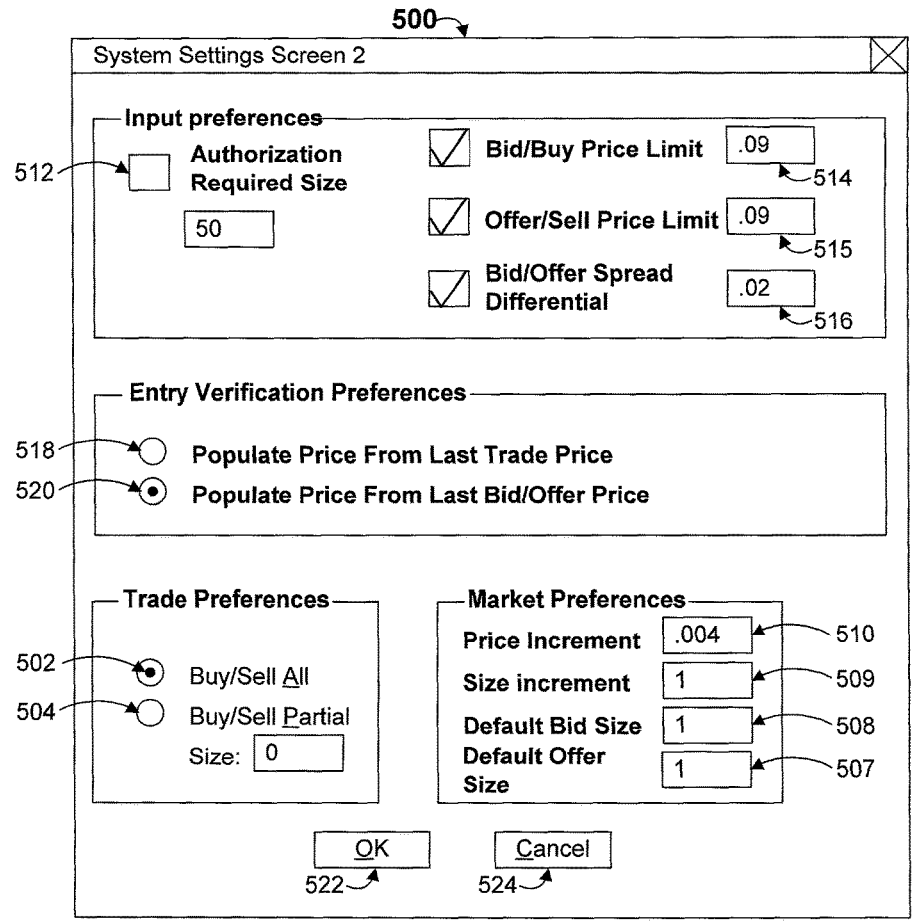

If, from systems settings screen 400, a trader presses "more settings" button 402, a second settings screen 500 may be displayed as shown in FIG. 5. As can be seen, second settings screen 500 may provide the trader with an ability to specify, using trade preferences, whether to buy or sell all 502 of the size of an offer or bid as displayed, or, regardless of the displayed size, to buy or sell a certain pre-designated size (Buy/Sell Partial Size 504) when clicking on a security in a market cell. Likewise, second settings screen 500 also permits the trader to specify a default offer size 507, a default bid size 508, a default size increment 509 for bids and offers that will be used for size up/down button depressions, and a default price increment 510 for bids and offers that will be used for price up/down button depressions. A trader may populate the default offer size 510 and default bid size 508 with numbers or ratios, which would be used to generate sizes.

Second settings screen 500 also allows the trader to specify limits to prevent accidental entry of a command for a price or size that is outside a reasonably expected range. By selecting box 512, the trader may enable a confirmation alert that prompts the trader for authorization to submit a command for a size larger than the limit (previously selected by the trader or set by the system based on the trader's previous trading history and the traded item's overall market history). By selecting and setting a bid/buy price limit 514 and an offer/sell price limit 515, the trader may also specify a maximum bid/buy price and a minimum offer/sell price. By selecting the bid/offer spread differential 416, the trader may enable two-sided market trading that generates a value from a value submitted and the bid/offer spread differential 416. For example, if a trader submits a bid price 324, the offer price 326 will automatically be generated from the bid price 324 submitted and the bid/offer spread differential 416. Likewise, if a trader submits an offer price 326, the bid price 324 will automatically be generated. As the name suggests, the bid/offer spread differential is the amount by which the offer price 326 will differ from the bid price 324.

Finally, as shown in second settings screen 500, the trader may select whether to automatically populate a bid/offer with a last trade price or a last bid/offer price using entry verification preferences 518 and 520.

Once a trader has completed setting the preferences, a trader may submit the preferences by pressing an "OK" button 522 or cancel the preferences by pressing a "Cancel" button 524.

If a trader presses the "more display settings" button in display preferences 408 of settings screen 400 of FIG. 4, display settings screen 600 may appear to allow the trader to specify screen colors, window positioning, and other display functions. By selecting "ON" button 602, a trader may choose to highlight a particular field of the dialog window whenever the pointing device passes over that field. Thus, for example, when a user passes a pointer over the price field, the field will automatically be highlighted while the system awaits user input into that field. The trader may turn this function off by pushing "OFF" button 604.

In addition to dragging the window and placing it in a preferred area on the screen, a user may set the default position of market cell 100 and dialog window by using pull-down menus 606 and 608. Specifically, the position of the market cell may be selected using market cell menu 606. Menu 606 may allow a trader to drag the main trading window to any position on the screen and thereafter use that position as the default position for the main trading window, to select a quadrant of the screen, or to select any other desired portion of the screen. Dialog window menu 608 may allow the trader to select the position of the dialog window using menu options similar to those described for market cell menu 606.

Display settings screen 600 also allows a user to select the color or other characteristic (e.g., blinking text, font size, etc.) of the bid or offer. A trader may select bid menu 610 to select a color or other display characteristic for the bid. Offer menu 612 may be selected to select the color or other display characteristics for an offer. Similar options may be implemented to allow a trader to select the color and other display factors for all parameters of a trade.

Finally, "OK" button 614 and "Cancel" button 616 may be used to either confirm changes or cancel the changes selected on display settings screen 600, respectively.

Although illustrated in a particular fashion for trading particular types of items, the present invention, and thus the interfaces shown in FIGS. 1-6, may be altered to facilitate trading of any type of tradable items.

Further, the present invention recognizes a hierarchy of levels—room, group, and issue—with regard to rules and settings. The room level is the highest level, the group level is the middle level, and the issue level is the lowest level. Accordingly, a rule or setting set a the room level will be true for all groups and issues. If, however, the same rule or setting is changed at the group level, thus conflicting with the rule or setting set at the room level, then the rule or setting set at the group level will take precedence over the rule or setting set at the room level for that particular group. If the same rule or setting is then changed at the issue level, giving each level a different rule or setting for the same field, then the rule or setting set at the issue level will take precedence over the rules or settings set above it at the group and room level for that particular issue.

It is possible to have multiple groups in a room, and each group has the potential for having different rules or settings. Similarly, it is possible to have multiple issues in a group, and each issue has the potential for having different rules or settings.

Figure 6:
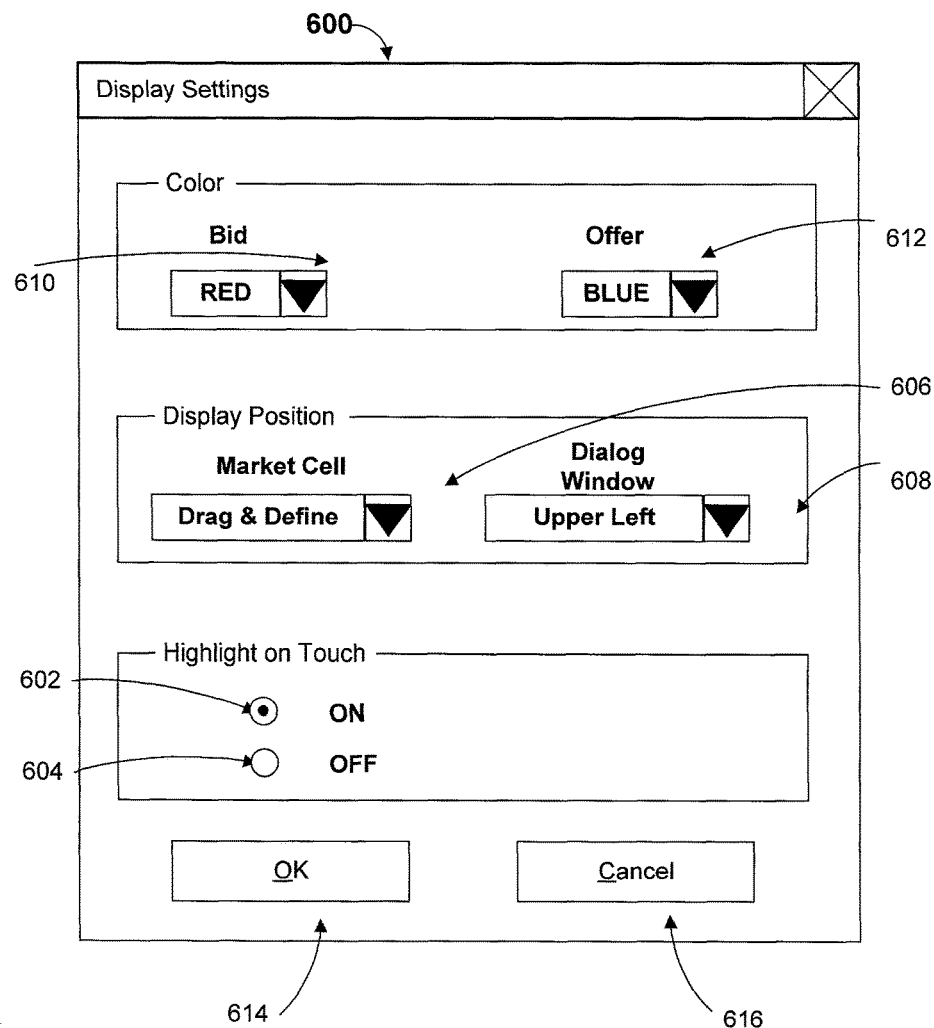
FIG. 6 is an illustration of a display settings window that may be generated in accordance with certain embodiments of the present invention.
Figure 7A:
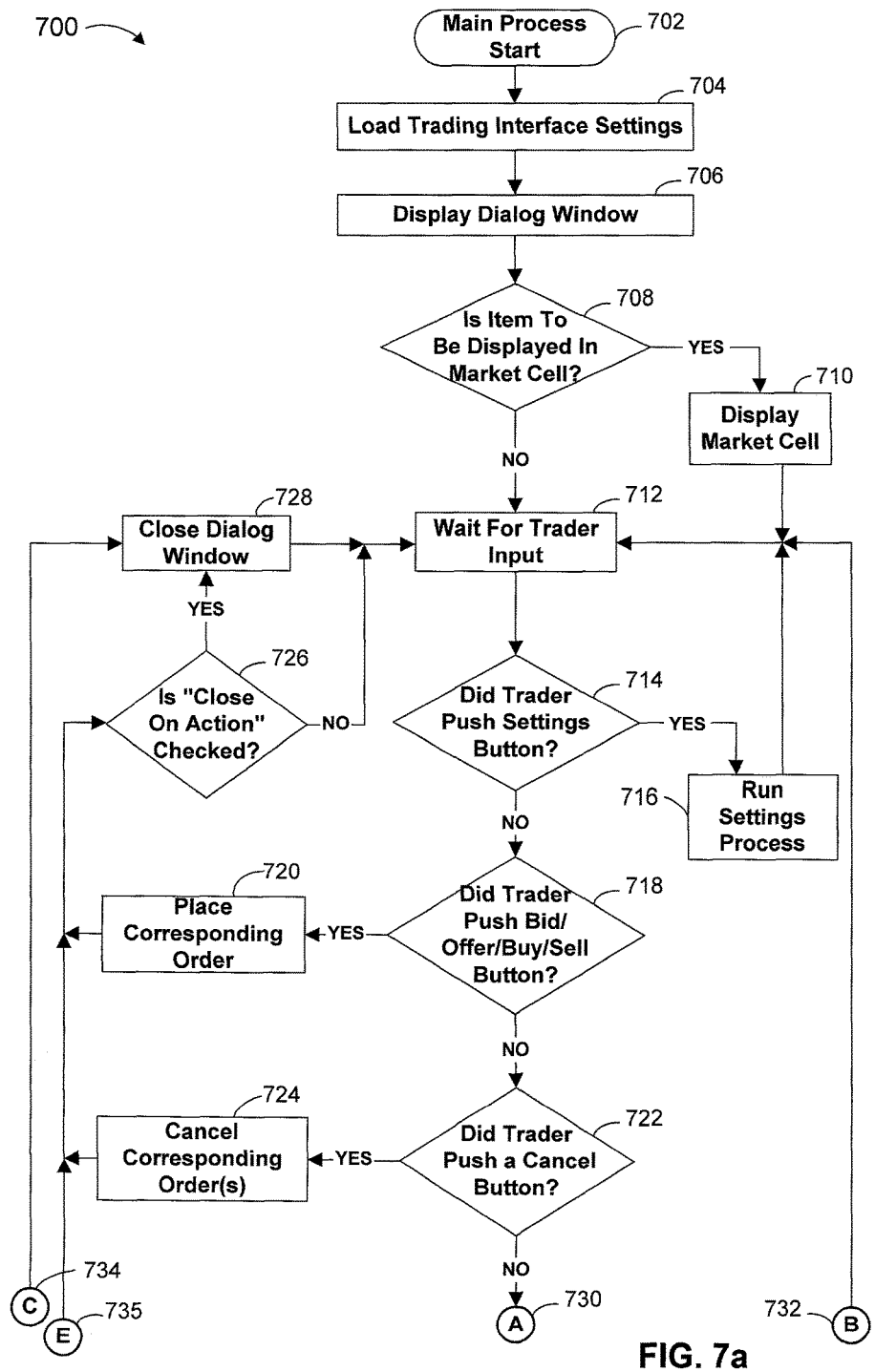
FIG. 7 is a flow diagram of a main process that may be used to perform the functions illustrated in FIGS. 1, 2 and 3 in accordance with certain embodiments of the present invention.
Figure 7B:
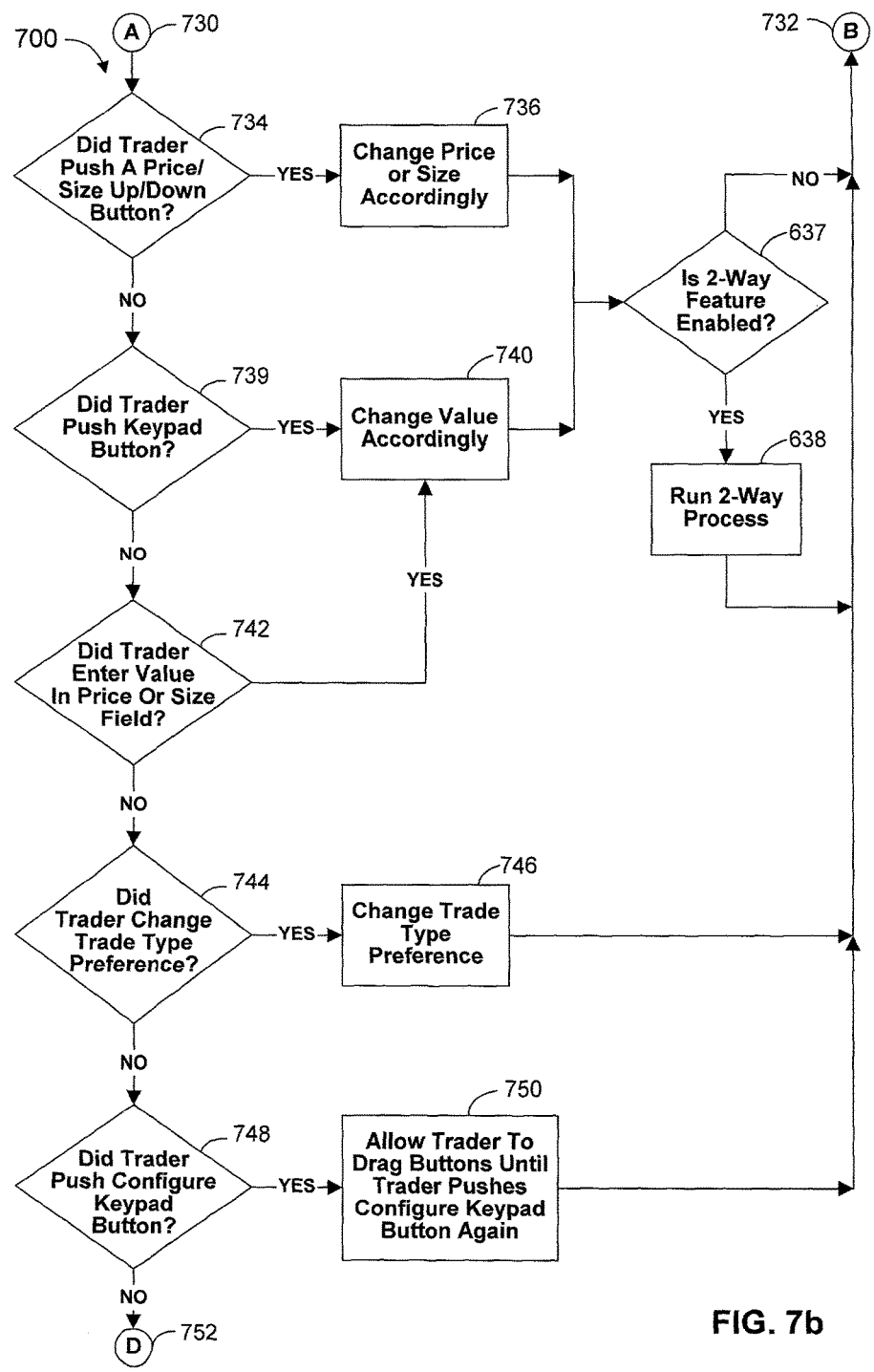
Figure 7C:
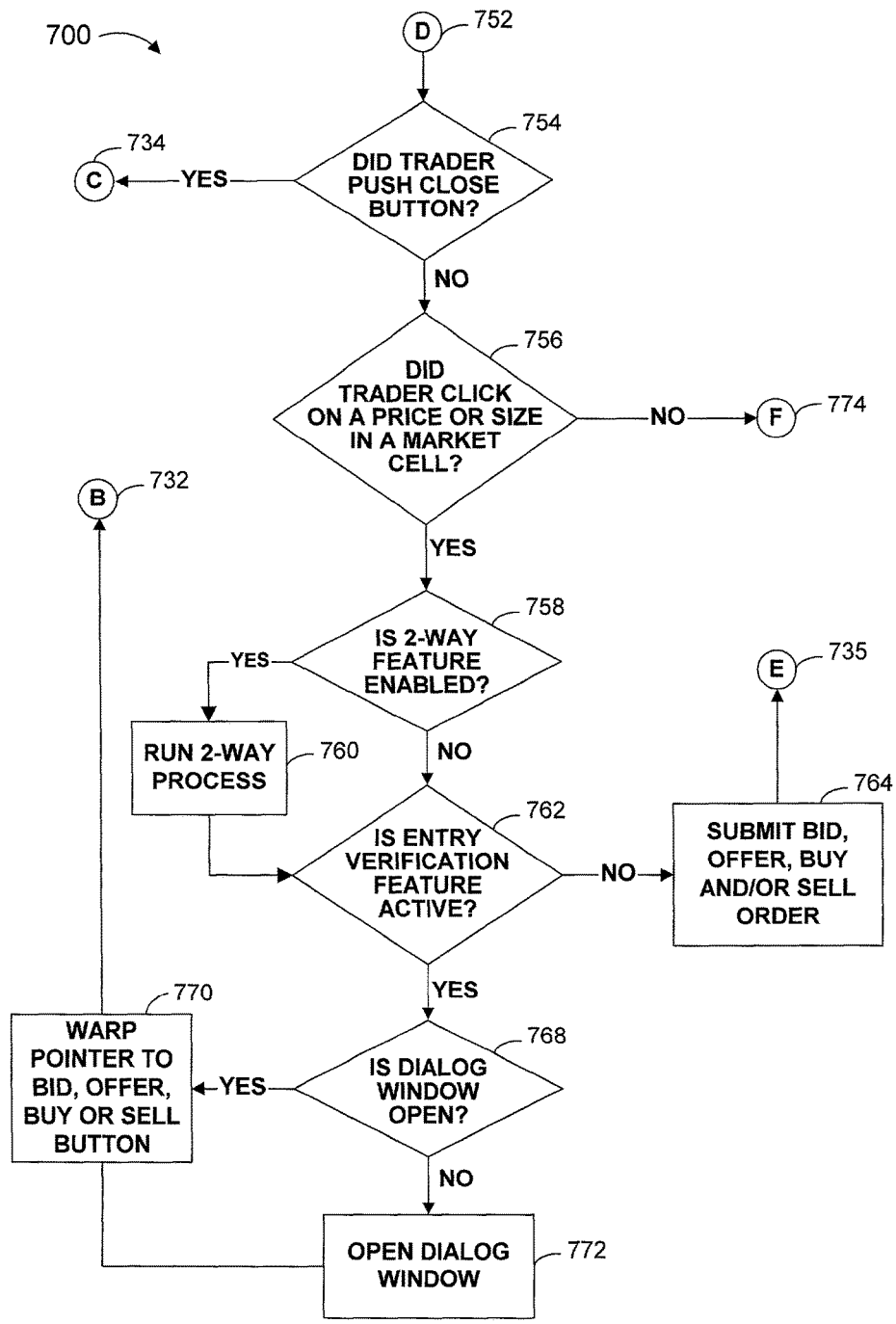
Figure 7D:
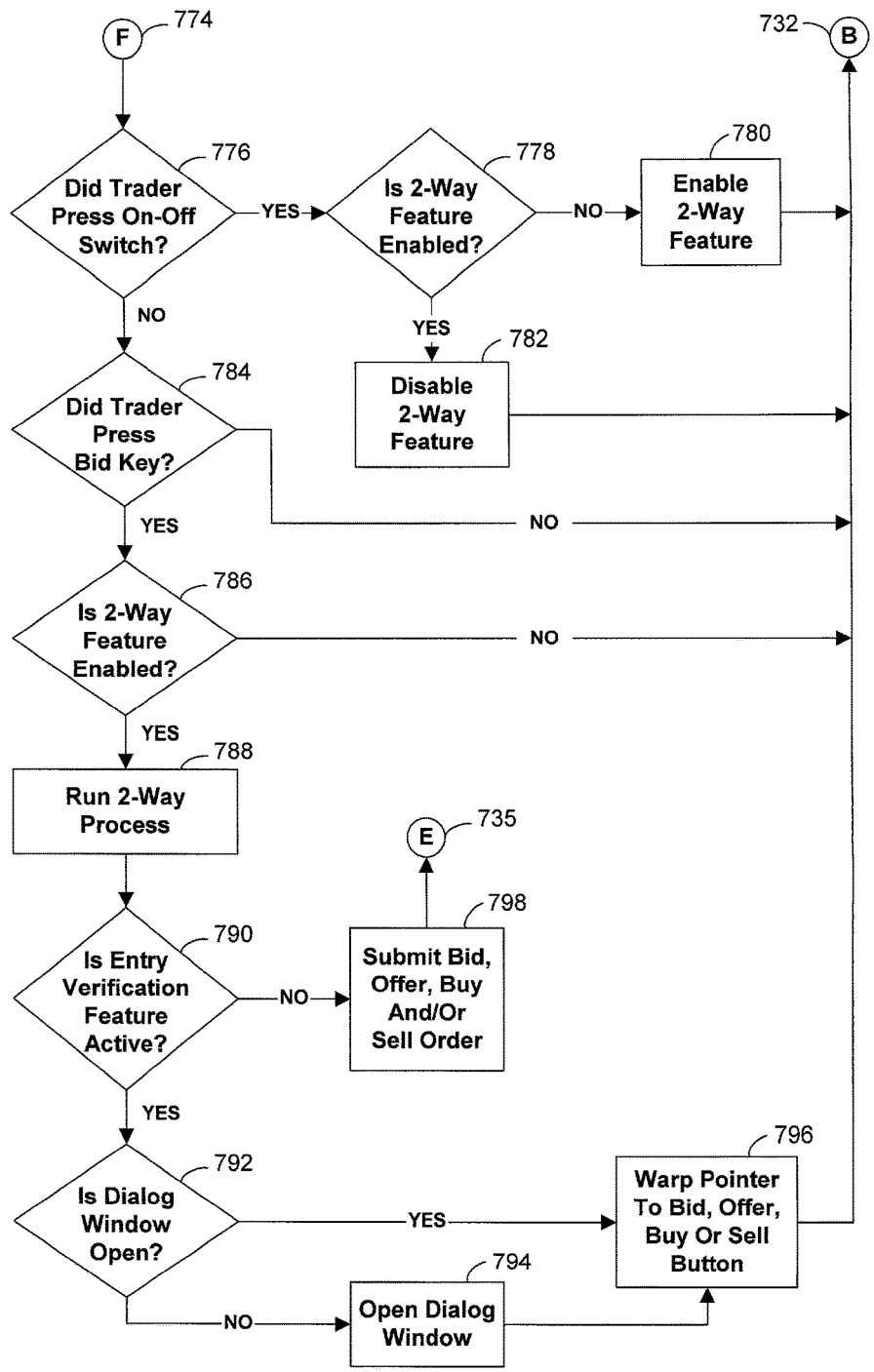

One embodiment of a main process 700 that may be used to control the presentation of the interfaces illustrated in FIGS. 1-6 is illustrated in FIGS. 7A-7C. As shown in FIG. 7A, once process 700 has begun at step 702, the process may load trading interface settings at step 704. The setting loaded at step 704 may include all of the settings configurable through screens 200, 300, 400, 500, and 600 and any other suitable settings. Once these settings are loaded, process 700 may display a dialog window 200 or 300 at step 706, depending on whether two-sided market trading is set as the default. If two-sided market trading is set as the default, then process 700 may display dialog window 300. Otherwise, process 700 may display dialog window 200. Based upon the settings loaded at step 704, process 700 then determines whether the item configured to be traded in dialog window 200 or 300 is to be displayed in a market cell. If it is, then process 700 presents a market cell 100 at step 710. Otherwise, or after displaying the market cell, process 700 proceeds to step 712 where the process waits for trader input.

Once trader input has been received at step 712, process 700 determines whether the trader pushed settings button 241 in dialog window 200 or settings button 341 in dialog window 300. If the trader did push the settings button, then process 600 runs a settings process at step 716. An example of a settings process is shown in FIG. 8. Once the settings process is completed, process 700 proceeds back to step 712 to wait for more trader input. If process 700 determines that the trader did not push the settings button at step 714, however, then process 700 proceeds to step 718 to determine if the trader pushed a bid button 212 or 312, an offer button 214 or 314, a buy button 204 or 304, or a sell button 206 or 306. If the trader did push one of these buttons, then the corresponding order is placed at step 720. Otherwise, process 700 proceeds to step 722 to determine if the trader pushed one of cancel buttons 208, 210, 216, 218, 220, 222, 308, 310, 316, 320, or 322. If so, then process 700 cancels the corresponding orders that can be canceled at step 724. Once an order has been placed at step 720, or orders have been canceled at step 724, process 700 determines at step 726 whether "close on action" box 238 or 338 is checked in dialog window 200 or 300, respectively. If not, process 700 loops back to step 712. Otherwise process 700 closes dialog window 200 or 300 at step 728 and then proceeds to step 712.

If, at step 722, process 700 determines that the trader did not push a cancel button, however, then process 700 proceeds to step 734 as shown in FIG. 7B via link 730. At step 734, process 700 determines whether the trader pushed a price or size up or down button 226, 228, 232, 234, 325, 327, 328, 330, 332 or 334. If the trader did push one of these buttons, process 700 changes the price or size accordingly at step 736 and then determines whether the two-sided market feature is enabled at step 737. If the two-sided market feature is enabled, then process 700 runs a two-sided market process at step 738. An example of a two-sided market process is shown in FIG. 9. Once the two-sided market process is completed, process 700 proceeds back to step 712 via link 732 to wait for more trader input. If process 700 determines that the two-sided market feature is not enabled at step 737, however, then process 700 proceeds to step 712 via link 732. Otherwise, process 700 proceeds to step 739 to determine if the trader pushed a button on keypad 202 or 302. If the trader did push one of these buttons, then the process changes the value of either the price or size highlighted accordingly at step 740 and then determines whether the two-sided market feature is enabled at step 737. If the two-sided market feature is enabled, then process 700 runs a two-sided market process at step 738. An example of a two-sided market process is shown in FIG. 9. Once the two-sided market process is completed, process 700 proceeds back to step 712 via link 732 to wait for more trader input. If process 700 determines that the two-sided market feature is not enabled at step 737, however, then process 700 proceeds to step 712 via link 732. If the trader did not push one of the keypad buttons, process 700 next determines at step 742 whether the trader submitted a value in price or size field 224, 230, 324, 326, 329 or 331. If the trader did submit a value, then process 700 changes the value in that field accordingly at step 740 and then determines whether the two-sided market feature is enabled at step 737. If the two-sided market feature is enabled, then process 700 runs a two-sided market process at step 738. An example of a two-sided market process is shown in FIG. 9. Once the two-sided market process is completed, process 700 proceeds back to step 712 via link 732 to wait for more trader input. If process 700 determines that the two-sided market feature is not enabled at step 737, however, then process 700 proceeds to step 712 via link 732.

If process 700 determines at step 742 that the trader did not submit a value in one of the price or size fields, then process 700 determines at step 744 whether the trader changed the trade type preference 236 or 336. If the trader did change this preference, the trade type preference is changed at step 746 and process 700 loops back to step 712 via link 732. Otherwise, process 700 determines at step 748 whether the trader pushed configure keypad button 240 or 340. If the trader did push this button, then the process allows the trader to drag buttons in dialog window to new locations until the trader pushes the configure keypad button again. The new locations of the relocated buttons are then stored as settings for dialog window 200 or 300 that are loaded at step 702 and used to define the button locations each time the dialog window is opened.

If process 700 determines at step 748 that the trader did not push the configure keypad button, then process 700 proceeds to step 754 via link 752. At step 754, process 700 determines if the trader pushed close button 242 or 342. If so, then process 700 loops back to step 728 via link 734 to close dialog window 200 or 300. Otherwise, process 700 determines at step 756 whether the trader clicked on a price 102 or 104 or size 106 or 108 in market cell 100. If the trader did click on a price or size in the market cell, then process 700 determines whether the two-sided market feature is enabled at step 758. If the two-sided market feature is enabled, then process 700 runs a two-sided market process at step 760. An example of a two-sided market process is shown in FIG. 9. Once the two-sided market process is completed, process 700 determines whether the entry verification feature is enabled at step 762. If the entry verification feature is not active, then process 700 submits a bid, offer, buy, and/or sell order based upon which price or size button was clicked, as described above, and then proceeds to step 726 via link 735. Otherwise, process 700 next determines whether dialog window 200 or 300 is open at step 768. If the dialog window is not open, then process 700 opens a dialog window 200 or 300 at step 772. After opening dialog window 200 or 300 at step 772, or if the dialog window was determined to be open at step 768, process 700 warps the pointer to the bid, offer, buy, or sell button based upon what was clicked in the market cell, and then process 700 loops back to step 712 via link 732.

If process 700 determines at step 756 that the trader did not click on a price 102 or 104 or size 106 or 108 in market cell 100, then process 700 proceeds to step 770 via link 774. At step 776, process 700 determines whether the trader pressed an ON-OFF switch. The ON-OFF switch may be a mere combination of the keyboard control key and an open keyboard key. The ON-OFF switch may be incorporated so traders do not have to go to system settings to disable or enable the two-sided market feature. For example, if the trader has the two-sided market feature enabled and wants to enter a one-sided market order for a specific item, the trader may disable the two-sided market feature without having to revert to the system settings. Conversely, if the trader is entering predominantly one-sided markets and decides to enter a two-sided market order for a specific item, then the trader may enable the two-sided market feature without having to revert to the system settings. At step 776, if process 700 determines that the trader pressed the ON-OFF switch, then process 700 determines whether the two-sided market feature is enabled at step 778. If not, process 700 enables the two-sided market feature at step 780 and loops back to step 712 via link 732. Otherwise, process 700 disables the two-sided market feature at step 782 and loops back to step 712 via link 732.

If the trader did not press the ON-OFF switch, then process 700 proceeds to step 784. At step 784, process 700 determines whether the trader pressed a bid key on the keyboard. The bid key, for example, may be the F6 key on a keyboard. If process 700 determines that the trader did not press the bid key, process 700 loops back to step 712 via link 732 to wait for more trader input. Otherwise, process 700 determines whether the two-sided market feature is enabled at step 786. If the two-sided market feature is not enabled, then process 700 loops back to step 712 via link 732 to wait for more trader input. Otherwise, process 700 runs a two-sided market process at step 788. An example of a two-sided market process is shown in FIG. 9. Once the two-sided market process is completed, process 700 determines whether the entry verification feature is active at step 790. If the entry verification feature is not active, then process 700 submits a bid and offer order based upon which price or size button was clicked, as described above, and then proceeds to step 726 via link 735. Otherwise, process 700 next determines whether dialog window 300 is open at step 792. If the dialog window is not open, then process 700 opens a dialog window 300 at step 794. After opening dialog window 300 at step 794, or if the dialog window was determined to be open at step 792, process 700 warps the pointer to the bid, offer, buy, or sell button based upon what was clicked in the market cell, and then process 700 loops back to step 712 via link 732.

One embodiment of a system settings process 800 that may be used to set system setting as illustrated in FIGS. 4-6 is shown in FIG. 8. As can be seen, upon pressing settings button 241 (FIG. 2) or 341 (FIG. 3), process 800 will preferably display system settings screen 400 as described in connection with FIGS. 4-6 at step 801. After displaying the system settings screen, process 800 awaits user input at step 802. Once user input is received, at step 803, process 800 determines whether the trader selected "more settings" button 402. If the trader selected "more settings" button 402, process 800 displays a second settings screen at step 804, as described in the description of FIG. 5. At step 804, the trader may then have an opportunity to adjust any setting on the second settings screen, and, at step 805, process 800 determines whether the trader pressed "OK" button 522 or "Cancel" button 524. If process 800 determines that the trader selected "Cancel" button 524, any changes made by the trader in the second settings screen will be ignored at step 806. If, however, the trader selected "OK" button 522, process 800 will proceed to step 807 and apply any changes made by the trader in the second settings screen.

If, at step 803, the trader was determined to not have chosen the "more settings" button, or after the completion of either step 806 or step 807, process 800 branches to step 808. At step 808, process 800 determines whether the trader selected the "more display settings" button from screen 400. If so, then process 800 displays display settings screen 600, as described in the description of FIG. 6, at step 809. Next, at step 810, process 800 determines whether the trader selected "OK" button 614 or "Cancel" button 616 within display settings screen 600. If the trader pressed "Cancel" button 616, process 800 cancels any display settings changes at step 811. If the trader pressed "OK" button 614, process 800 applies any display settings changes at step 812.

After completing step 811 or 812, or if process 800 determines that the "more display settings" button was not selected at step 808, process 800 determines whether the trader selected "OK" button 412 or "Cancel" button 414 at step 813. If neither "OK" button 412 or "Cancel" button 414 was selected, process 800 loops back to step 802 where the process will once again await user input. If the trader selected "Cancel" button 414, however, process 800 will proceed to step 814 and cancel all changes made at the system settings screen. Hitting "Cancel" button 414, however, preferably will not cancel changes that the trader may have made in the second setting screen displayed at step 804 or in the display settings screen display at step 809. If the trader, selected "OK" button 412, process 800 will proceed to step 815. Step 815 accepts and applies any changes made in the system settings screen. After completing step 814 or 814, process 800 terminates.

One embodiment of the two-sided market process 900 that may be used to generate prices is shown in FIG. 9. As can be seen, upon pressing 2-way button 244 (FIG. 2), selecting 2-way default box 245 (FIG. 2), enabling 2-way trading (FIG. 4) or selecting bid/offer spread differential box 516 (FIG. 5), process 900 will be preferably used to generate a value from a submitted value, as described in connection with FIGS. 2-5. At step 904, process 900 determines whether the trader submitted a bid price, an offer price, a bid size, and an offer size. If the trader did submit these values, then process 900 overrides the value entered in the bid/offer spread differential field 516 at step 906. Overriding the value in the bid/offer spread differential field 516 allows the trader to submit a bid and an offer price for a particular item without having to disable the two-sided market feature and without having to enter a new value in the bid/offer spread differential field 516. For example, if the trader is using the command-line interface, the trader may submit an offer price followed by a space, a bid price followed by a space, a bid size followed by a space, an offer size, and press a bid key to override the set bid/offer spread differential for that trade. After completing step 906, process 900 terminates.

If process 900 determines at step 904 that the trader did not submit a bid price, an offer price, a bid size, and an offer size, then process 900 generates a value from the submitted value and a value entered in the bid/offer spread differential field 516. After completing step 908, process 900 terminates.

In accordance with the present invention, a data window may be used in addition to or instead of market cell 100 to initiate or submit order commands via dialog window 200 or 300. The Data window may be any window for displaying data on tradable items. For example, a data window may be a market data display, a web page including financial data or auction information, a spread sheet, etc. As another example, as shown in FIG. 10, a data window 1000 may be used for this purpose. Data window 1000 is a Bond Analysis window that is part of the Reuters 3000 Xtra product that is available from Reuters Limited. Within data window 1000 is a field 1002 that contains information on various bonds 1004-1016. By clicking on any of bonds 1004-1016, a trader can cause a bid command to be submitted via dialog window 200 or 300.

An example of an order entry process 1100 for enabling the submitting of order commands via dialog window 200 or 300 and a data window is shown in FIG. 11. Through this process, an entry window that is either a replica of the data entry window or the data window itself is used to detect when a trader selects an item within the data window. As illustrated, after process 1100 has begun at step 1102, this process loads settings for an entry window at step 1104. Next, based upon the settings loaded, process 1100 determines at step 1106 whether to replicate a data window for the entry window or to use the data window itself as the entry window. If the data window is to be replicated for the entry window, then process 1100 proceeds to step 1116 at which the data window is replicated as the entry window. Although replication of the data window is illustrated as part of process 1100, replication may be performed using an automated process or may be performed substantially simultaneously with manual copying of the data window.

Next, at step 1118, process 1100 monitors data that is being sent to the data window and populates fields within the entry window with that data. Through steps 1116 and 1118, the entry window preferably appears identical to the data window. Alternatively, the entry window may be different from the data window and use the data window data. Following step 1118, process 1100 determines at step 1120 whether a trader clicked on a field in entry window. As part of the replication of the data window, the entry window is preferably constructed to facilitate detection of clicks on various fields within the entry window. If the trader did click on a field in the entry window, the click and corresponding data in the entry window are sent to dialog window 200 or 300 as a substitute for a click on a price or size in market cell 100 at step 1122. The click and corresponding data are preferably detected by main process 700 at step 756 and appear to process 700 like a click on a price or size in a market cell. Because the trader may click on a variety of items in the entry window, the data accompanying the click may be used by process 700 to select another tradable item prior to submitting a bid, offer, buy, and/or sell command. If no click is detected at step 1120, or after the click and data have been sent to main process 700 at step 1122, process 1100 loops back to step 1118.

If, at step 1106, process 1100 determines that the data window is not to be replicated, then process 1100 displays the data window and uses the data window as the entry window. Because the data window may not be an interactive window, process 1100 may monitor the mouse position and clicks at step 1110 to determine whether the trader is trying to click on an element in the data window as the entry window. Next, at step 1112, process 1100 determines whether the trader clicked on a monitored field in the entry window. If the trader did click on a monitored field, process 1100, at step 1114, strips the data from the monitored field, substitutes the click and stripped data for a click on a price or size in the market cell, and sends that click and data to main process 700. The data may be stripped by monitoring the data being fed to the data window, by scanning video memory corresponding to the field of the data window clicked on, or using any other suitable process. The click and stripped data are preferably detected by main process 700 at step 756 and appear to process 700 like a click on a price or size in a market cell. Because the trader may click on a variety of items in the entry window, the data accompanying the click may be used by process 700 to select another tradable item prior to submitting a bid, offer, buy, and/or sell command. If no click is detected at step 1112, or after the click and data have sent to main process 700 at step 1114, process 1100 loops back to step 1110.

One example of a system 1200 for implementing the present invention is shown in FIG. 12. As illustrated, system 1200 may include one or more computers 1201, including a mouse 1206, that are connected by one or more communication links 1202 to a computer network 1203 that is linked via a communication link 1205 to a trading server 1204.

In system 1200, trading server 1204 may be any suitable server, processor, computer, or data processing device, or combination of the same. Computer network 1203 may be any suitable computer network including the Internet, an Intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communication links 1202 and 1205 may be any suitable communication links suitable for communicating data between computers 1201 and server 1204, such as network links, dial-up links, wireless links, hard-wired links, etc. User computers 1201 may be any suitable computers, processors, computer terminals, displays, portable computers, personal digital assistants, or any other suitable data processing devices, or combinations of the same.

One of ordinary skill in the art should appreciate that the present invention may be practiced in embodiments other than those illustrated herein without departing from the spirit and scope of the present invention, and that the invention is only limited by the claims which follow.

What is claimed is:
1. An apparatus comprising
a display device;
at least one processor to:
render on the display device a cell comprising a bid size, a bid price, an offer size and an offer price for an instrument on a graphical user interface;
detect selection within the cell of the bid price or the offer price for the instrument;
render a dialog window on the display device with a bid button, an offer button, a bid size field pre-populated with the bid size, a bid price field pre-populated with the bid price, an offer size field pre-populated with the offer size, and an offer price field pre-populated with the offer price;
automatically reposition a pointer immediately above the bid button of the dialog window, if the bid price was selected within the cell;
automatically reposition a pointer immediately above the offer button of the dialog window, if the offer price was selected within the cell;
detecting entry of another bid price or offer price;
automatically populating the bid price field with a new bid price in response to detecting the entry, the new bid price being based on the pre-set spread amount and the entered offer price; and
automatically populating the offer price field with a new offer price in response to detecting the entry, the new offer price being based on a pre-set spread amount and the entered bid price;
detect a selection of the bid button or the offer button; and generate a bid command and an offer command for the instrument simultaneously, in response to the selection of the bid button or the offer button.

2. The apparatus of claim 1, wherein the at least one processor is further configured to detect a selection of the bid button and submit a bid for the instrument to an electronic network, in response to the selection of the bid button.

3. The apparatus of claim 1, wherein the at least one processor is further configured to detect a selection of the offer button and submit an offer for the instrument to an electronic network, in response to the selection of the offer button.

4. The apparatus of claim 1, wherein the at least one processor is further configured to detect input of a change in the bid price of the dialog window.

5. The apparatus of claim 1, wherein the at least one processor is further configured to detect input of a change in the offer price of the dialog window.

6. The apparatus of claim 1, wherein the at least one processor is further configured to detect input of a change in the offer price of the dialog window.

7. The apparatus of claim 1, wherein the at least one processor is further configured to detect a selection of the bid button and submit a bid and corresponding offer for the instrument to an electronic network, in response to the selection of the bid button.

8. The apparatus of claim 1, wherein the at least one processor is further configured to detect a selection of the offer button and submit an offer and a corresponding bid for the instrument to an electronic network, in response to the selection of the offer button.

9. The apparatus of claim 1, wherein the at least one processor is configured to rearrange buttons on the dialog window.

10. A method comprising:
rendering, by at least one processor, on a display device a cell comprising a bid size, a bid price, an offer size, and an offer price for an instrument on a graphical user interface;
detecting, by the at least one processor, a selection within the cell of the bid price or the offer price for the instrument;
rendering, by the at least one processor, a dialog window on the display device with a bid button, an offer button, a bid size field pre-populated with the bid size, a bid price field pre-populated with the bid price, an offer size field pre-populated with the offer size, and an offer price field pre-populated with the offer price;
automatically repositioning, by the at least one processor, a pointer immediately above the bid button of the dialog window, if the bid price within the cell was selected; and
automatically repositioning, by the at least one processor, a pointer immediately above the offer button of the dialog window, if the offer price within the cell was selected;
detecting entry of another bid price or offer price;
automatically populating the bid price field with a new bid price in response to detecting the entry, the new bid price being based on the pre-set spread amount and the entered offer price; and
automatically populating the offer price field with a new offer price in response to detecting the entry, the new offer price being based on a pre-set spread amount and the entered bid price;
detecting, by the at least one processor, a selection of the bid button or the offer button; and
generating, by the at least one processor, a bin command and an offer command for the instrument simultaneously, in response to the selection of the hid button or the offer button.

11. The method of claim 10, further comprising detecting, by the at least one processor, a selection of the bid button and submit a bid for the instrument to an electronic network, in response to the selection of the bid button.

12. The method of claim 10, further comprising detecting, by the at least one processor, a selection of the offer button and submit an offer for the instrument to an electronic network, in response to the selection of the offer button.

13. The method of claim 10, further comprising detecting, by the at least one processor, input of a change in the bid price of the dialog window.

14. The method of claim 10, further comprising detecting, by the at least one processor, input of a change in the offer price of the dialog window.

15. The method of claim 10, further comprising detecting, by the at least one processor, input of a change in the offer price of the dialog window.

16. The method of claim 10, further comprising detecting, by the at least one processor, a selection of the hid button and submitting, by the at least one processor, a bid and corresponding offer for the instrument to an electronic network, in response to the selection of the bid button.

17. The method of claim 10, further comprising detecting, by the at least one processor, a selection of the offer button and submitting, by the at least one processor, an offer and a corresponding hid for the instrument to an electronic-network, in response to the selection of the offer button.

18. The method of claim 10, further comprising rearranging, by the at least one processor, buttons on the dialog window.

* * * * *